(12) United States Patent
Levit et al.

(10) Patent No.: US 9,734,826 B2
(45) Date of Patent: Aug. 15, 2017

(54) TOKEN-LEVEL INTERPOLATION FOR CLASS-BASED LANGUAGE MODELS

(71) Applicant: Microsoft Technology Licensing, LLC, Redmond, WA (US)

(72) Inventors: Michael Levit, San Jose, CA (US); Sarangarajan Parthasarathy, Mountain View, CA (US); Andreas Stolcke, Berkeley, CA (US); Shuangyu Chang, Freemont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/644,976

(22) Filed: Mar. 11, 2015

(65) Prior Publication Data

US 2016/0267905 A1 Sep. 15, 2016

(51) Int. Cl.
*G10L 15/00* (2013.01)
*G10L 15/183* (2013.01)
(Continued)

(52) U.S. Cl.
CPC .......... *G10L 15/183* (2013.01); *G10L 15/063* (2013.01); *G10L 15/197* (2013.01); *G10L 15/1815* (2013.01)

(58) Field of Classification Search
USPC ................................ 704/246, 247, 251, 252
See application file for complete search history.

(56) References Cited

U.S. PATENT DOCUMENTS 6,754,626 B2    6/2004  Epstein
7,392,186 B2 *  6/2008  Duan .................... G10L 15/197
                                                     704/243

(Continued)

FOREIGN PATENT DOCUMENTS

EP   1582998 A2   10/2005
WO   0031727 A1    6/2000

OTHER PUBLICATIONS

Levit, et al., "Word-Phrase-Entity Language Models: Getting More Mileage out of N-grams", In Proceedings of 15th Annual Conference of the International Speech Communication Association, Sep. 2014, 5 pages.

(Continued)

*Primary Examiner* — Leonard Saint Cyr
(74) *Attorney, Agent, or Firm* — Shook, Hardy & Bacon L.L.P.

(57) ABSTRACT

Optimized language models are provided for in-domain applications through an iterative, joint-modeling approach that interpolates a language model (LM) from a number of component LMs according to interpolation weights optimized for a target domain. The component LMs may include class-based LMs, and the interpolation may be context-specific or context-independent. Through iterative processes, the component LMs may be interpolated and used to express training material as alternative representations or parses of tokens. Posterior probabilities may be determined for these parses and used for determining new (or updated) interpolation weights for the LM components, such that a combination or interpolation of component LMs is further optimized for the domain. The component LMs may be merged, according to the optimized weights, into a single, combined LM, for deployment in an application scenario.

20 Claims, 7 Drawing Sheets

(51) Int. Cl.
G10L 15/06 (2013.01)
G10L 15/197 (2013.01)
G10L 15/18 (2013.01)

(56) References Cited

U.S. PATENT DOCUMENTS

| | | | |
|---|---|---|---|
| 7,478,038 | B2 | 1/2009 | Chelba et al. |
| 7,739,286 | B2 | 6/2010 | Sethy et al. |
| 7,813,926 | B2 | 10/2010 | Wang et al. |
| 7,835,911 | B2 | 11/2010 | Balchandran et al. |
| 8,374,871 | B2 | 2/2013 | Ehsani et al. |
| 8,447,608 | B1 | 5/2013 | Chang et al. |
| 2004/0210434 | A1 | 10/2004 | Wang et al. |
| 2004/0249628 | A1* | 12/2004 | Chelba ............... G06F 17/2715 704/4 |
| 2005/0228667 | A1* | 10/2005 | Duan .................. G10L 15/197 704/256 |
| 2008/0215311 | A1* | 9/2008 | Chelba ............... G06F 17/2715 704/9 |
| 2009/0006092 | A1 | 1/2009 | Miki et al. |
| 2014/0372119 | A1 | 12/2014 | Parada et al. |
| 2015/0088511 | A1 | 3/2015 | Bharadwaj et al. |
| 2015/0287405 | A1* | 10/2015 | Biadsy ................. G10L 15/18 704/257 |

OTHER PUBLICATIONS

Dempster, et al., "Maximum Likelihood from Incomplete Data via the EM Algorithm", In Journal of the Royal Statistical Society. Series B (Methodological), vol. 39, No. 1, Retrieved on: Oct. 1, 2014, 39 pages.
Stolcke, Andreas, "An Efficient Probabilistic Context-Free Parsing Algorithm that Computes Prefix Probabilities", In Journal of Computational Linguistics, vol. 21, Issue 2, Jun. 1995, 36 pages.
Stolcke, Andreas, "SRILM—An Extensible Language Modeling Toolkit", In Proceedings of 7th International Conference on Spoken Language Processing, Sep. 16, 2002, 4 pages.
Liu, et al., "Use of Contexts in Language Model Interpolation and Adaptation", In Proceedings of Computer Speech & Language, vol. 27, No. 1, Jan. 2013, 4 pages.
U.S. Appl. No. 14/271,962, Stolcke, et al., "Language Model Optimization for In-Domain Application", filed May 7, 2014.
Liu, et al., "Use of Contexts in Language Model Interpolation and Adaptation", In Technical Report 630, Feb. 2009, 23 pages.
Ballinger, et al., "On-Demand Language Model Interpolation for Mobile Speech Input", In Proceedings of 11th Annual Conference of the International Speech Communication Association, Sep. 26, 2010, 4 pages.
Liu, et al., "Context Dependent Language Model Adaptation", In Proceedings of 9th Annual Conference of the International Speech Communication Association, Sep. 22, 2008, 4 pages.
Saluja, et al., "Context-aware Language Modeling for Conversational Speech Translation", In Proceedings of Machine Translation Summit XIII, Sep. 2011, 8 pages.
Bisazza, et al., "Class-Based Language Modeling for Translating into Morphologically Rich Languages", In Proceedings of the 25th International Conference on Computational Linguistics, Aug. 23, 2014, 10 pages.
Moore, et al., "Class-Based Language Model Adaptation using Mixtures of Word-Class Weights", In Proceedings of 6th International Conference of Spoken Language Processing, Oct. 16, 2000, 8 pages.
Haidar, et al., "Interpolated Dirichlet Class Language Model for Speech Recognition Incorporating Long-distance N-grams", In Proceedings of the 25th International Conference on Computational Linguistics, Aug. 23, 2014, 10 pages.

Liang, et al., "Language Model Adaptation Based on the Classification of a trigram's Language Style Feature", In Proceedings of IEEE International Conference on Natural Language Processing and Knowledge Engineering, Oct. 30, 2005, 6 pages.
Liu, et al., "Context Dependent Language Model Adaptation", In Proceedings of 9th Annual Conference of the International Speech Communication Association, Sep. 14, 2008, 15 pages.
Yokoyama, et al., "Unsupervised Language Model Adaptation Using Word Classes for Spontaneous Speech Recognition", In Proceedings IEEE-ISCA Workshop on Spontaneous Speech Processing and Recognition, Apr. 13, 2003, 4 pages.
Hsu, Bo-June (Paul), "Generalized Linear Interpolation of Language Models", In Proceedings of Workshop on Automatic Speech Recognition and Understanding, Dec. 9, 2007, 5 pages.
Sak, et al., "On-the-fly Lattice Rescoring for Real-time Automatic Speech Recognition", In Proceedings of 11th Annual Conference of the International Speech Communication Association, Sep. 26, 2010, 4 pages.
Ng, et al., "Adaptation of Lecture Speech Recognition System with Machine Translation Output", In Proceedings of IEEE International Conference on Acoustics, Speech and Signal Processing, May 26, 2013, 5 pages.
International Preliminary Report on Patentability dated Jul. 20, 2016 for International Patent Application No. PCT/US2015/029658, 16 pages.
Watkins, et al., "Example-Based Speech Recognition using Formulaic Phrases," In: 10th Annual Conference of the International Speech Communication Association (Interspeech), Sep. 6, 2009, 4 pages.
McGraw, et al., "Automating Crowd-supervised Learning for Spoken Language Systems," In Proceedings of 13th Annual Conference of the International Speech Communication Association, Sep. 9, 2012, 4 pages.
Non-Final Office Action dated Aug. 27, 2015 in U.S. Appl. No. 14/271,962, 16 pages.
International Search Report and Written Opinion Issued in PCT Application No. PCT/US2015/029658, Mailed Date: Aug. 27, 2015, 13 Pages.
Deligne, et al., "Language Modeling by Variable Length Sequences: Theoretical Formulation and Evaluation of Multigrams", International Conference on Acoustics, Speech and Signal Processing, May 9, 1995, pp. 169-172.
Michael Levit, Sarangarajan Parthasarathy, Shuangyu Chang, Andreas Stolcke, and Benoit Dumoulin, Word-Phrase-Entity Language Models: Getting More Mileage out of N-grams, in Proc. Interspeech, ISCA—International Speech Communication Association, Singapore, Sep. 15, 2014.
Final Office Action dated Apr. 21, 2016 in U.S. Appl. No. 14/271,962, 18 pages.
International Search Report and Written Opinion Issued in PCT Application No. PCT/US2016/021416, Mailed Date: Apr. 29, 2016, 15 Pages.
Chen, et al., "Adapted Language Modeling for Recognition of Retelling Story in Language Learning", International Conference on Audio, Language and Image Processing (ICALIP), IEEE, Jul. 16, 2012, 5 Pages.
Levit, et al., "Token-Level Interpolation for Class-Based Language Models", International Conference on Acoustics, Speech and Signal Processing (ICASSP), IEEE, Apr. 1, 2015, 5 Pages.
Second Written Opinion Issued in PCT Application No. PCT/US2015/029658, Mailed Date: Mar. 24, 2016, 6 Pages.
Non-Final Office Action dated Jan. 26, 2017 in U.S. Appl. No. 14/271,962, 17 pages.
"Second Written Opinion Issued in PCT Application No. PCT/US2016/021416", dated Jan. 25, 2017, 8 Pages.

* cited by examiner

TOKEN-LEVEL INTERPOLATION FOR CLASS-BASED LANGUAGE MODELS

BACKGROUND

Automatic speech recognition (ASR) uses language models for determining plausible word sequences for a given language or application domain. In some instances, these language models may be created or customized for target domains by using language model (LM) interpolation. In LM interpolation, a number of component LMs, each of which may be designed to reflect particular source or corpora, are combined together using weights optimized on a random sample drawn from the target domain. Therefore determining these optimized interpolation weights is a primary goal in ASR techniques that utilize LM interpolation.

But determining optimized interpolation weights poses particular challenges. For instance, where the component LMs are class-based, there is no common denominator or single (word-level) representation of the training corpus used for optimizing the interpolation weights. This causes the component models to compete with each other. Additional challenges are introduced in scenarios employing context-specific interpolation, which produces results that are superior to interpolation that does not account for context. Attempts to mitigate these challenges yield poor performance such as low resolution, and are inefficient or contextually unaware. Furthermore, it is not possible under existing approaches to achieve a combination of class-based LMs with context-specific interpolation.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the invention are directed towards systems and methods for determining and optimizing interpolated language models. A number of component LMs may be interpolated and optimized for a target domain by reducing the perplexity of in-domain training material. The component LMs may include class-based LMs, and the interpolation may be context-specific or context-independent. In particular, by way of iterative processes, component LMs may be interpolated and used to express training material in terms of n-grams (basic units of language modeling) in a number of alternative ways. Posterior probabilities may be determined for these alternative representations or "parses" of the training material, and used with the parses for determining updated interpolation weights. These updated interpolation weights may be used to produce new (or updated) weighting coefficients for LM components, such that a combination or interpolation of component LMs is further optimized for the target domain. In this way, embodiments of the invention may provide a single unified language-modeling approach that is extendible to work with context-specific interpolation weights and compatible with class-based and token-based modeling including dynamic token definitions. These interpolated LMs therefore may provide adaptability, personalization, and dynamically defined classes, as well as offer significant improvements in speech recognition accuracy and understanding, machine translation, and other tasks where interpolated LMs are used.

As will be further described, in one embodiment, an iterative optimization algorithm is employed for determining the interpolation weights of component LMs. A number of component LMs are interpolated and used to parse a corpus of training material into a collection of alternative representations or parses. The parses may comprise a path or sequence of "tokens" representing words, entities (or classes), or phrases in the training corpus. Corresponding posterior probabilities are determined for each parse, indicating the probability of the parse given the set of component LMs. Using these posterior probabilities, updated interpolation coefficients are determined that reflect contribution by the component LMs for each token n-gram relative to the sum of contributions of all component LMs towards the probability of that particular n-gram. The updated interpolation coefficients (or weights) are used with the component LMs to produce an updated (or retrained) LM interpolation that is further optimized for the target domain. The updated LM interpolation is used to determine alternative parsed representations of the corpus for a next iteration, and the probabilities and weights determined with these alternative parsed representations are used to update (retrain) the LM interpolation again. Thus, with each iteration, alternative parsed representations of the training corpus are determined using the LM interpolation, and the LM interpolation is updated to reflect the updated weights determined in that iteration. In this manner, each iteration results in an LM interpolation that is further optimized for the corpus domain.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
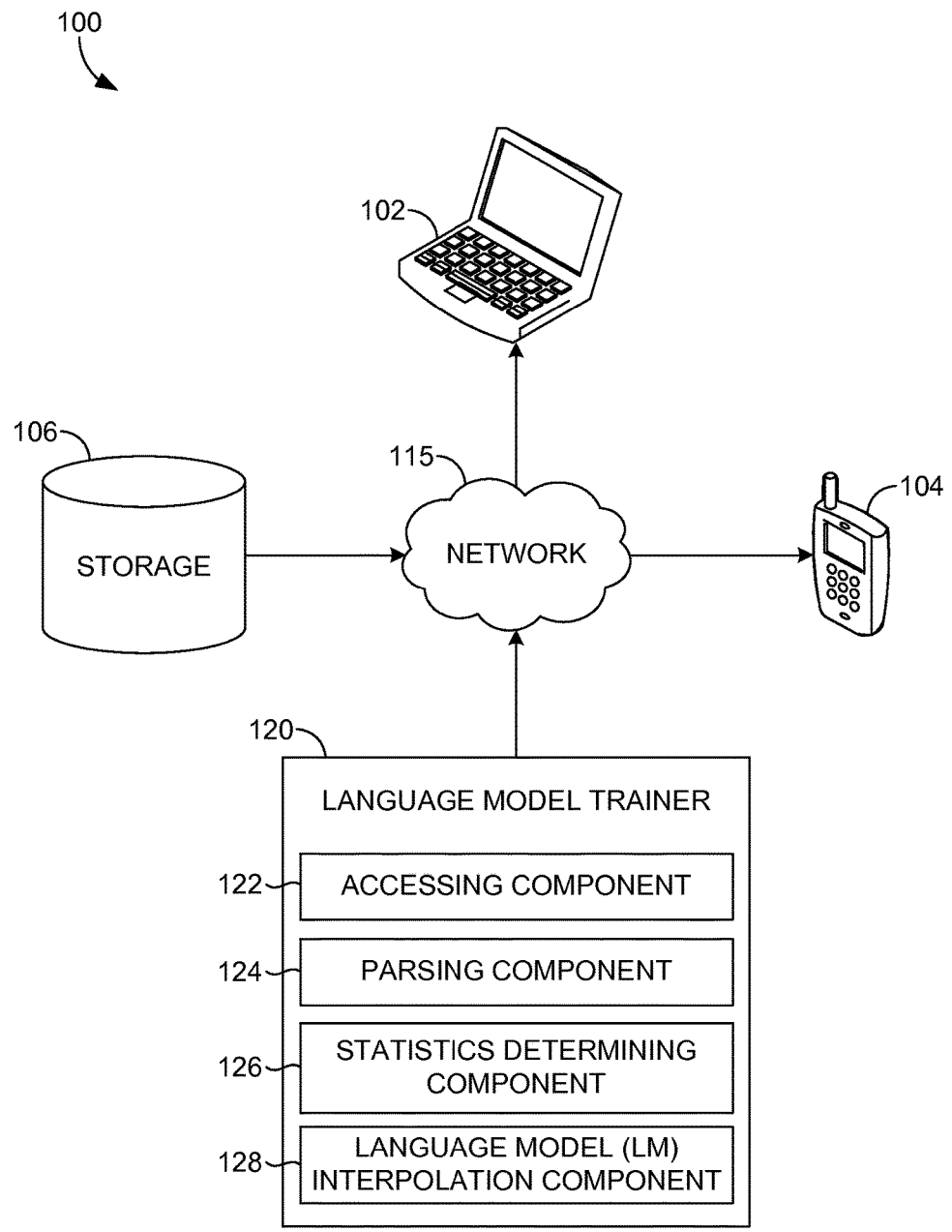
FIG. 1 is a block diagram of an example system architecture in which an embodiment of the invention may be employed.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the technology described herein are directed towards systems, methods, and computer storage media for, among other things, determining optimized language models for in-domain applications. In embodiments of the invention, LM interpolations may be optimized for target domains through an iterative, joint-modeling approach that expresses in-domain training material as alternative representations. The component LMs may include class-based LMs, and the interpolation may be context-specific or context-independent.

More specifically, by way of iterative processes, component LMs may be interpolated and used to express training material as alternative representations of LM units, which may include higher-level units, such as named entities and phrases. In particular, some embodiments of the invention automatically determine these alternative representations or "parses" of a training corpus in terms of "tokens" or (words, entities, or phrases), which may be grouped as n-grams when determining the probabilities of the sequences of such tokens. Posterior probabilities may be determined for these alternative representations or "parses" and used with the parses for determining updated interpolation weights. These updated interpolation weights then may be used to produce new (or updated) weighting coefficients for the LM components, such that the combination or interpolation of component LMs is further optimized for the target domain. Thus, embodiments of the invention may provide a single unified language-modeling approach that is extendible to work with context-specific interpolation weights and compatible with class-based and token-based modeling including dynamic token definitions (such as tokens defined at the time of recognition, as in the case of personalization).

When several component LMs are linearly interpolated, the resultant language model computes the overall probability of a word given word history as:

$$p(w|h) := \sum_m \lambda_m * p_m(w|h)$$

A goal of the interpolation and optimization process is to determine optimized interpolation weights $\lambda_m$ so as to minimize perplexity of the resultant interpolated LM on an in-domain sample corpus. One approach to this task uses Expectation Maximization (EM) to estimate interpolation weights as n-gram responsibilities of each model averaged over the entire training corpus:

$$\lambda_m := \frac{1}{N} * \sum_{n=1}^{N} \left( \lambda_m * p_m(w|h) \Big/ \sum_l \lambda_l * p_l(w|h) \right)$$

In the case of the context-specific scenario, one vector of interpolation weights $\lambda_m$ may be optimized for each history $h$, with the overall probability of a word given word history as:

$$p(w|h) := \sum_m \lambda_m(h) * p_m(w|h)$$

However, as described previously, if at least one of the component LMs to be interpolated is class-based, this approach does not work because there is no single (word-level) representation of the training corpus anymore. Instead, several alternative representations (parses) will be competing and splitting probability mass. For instance, for LMs that understand classes CITY, STATE and NAME, the sentence "Virginia Smith lives in Long Island New York" can be parsed as "NAME lives in CITY STATE" or "STATE Smith lives in Long Island STATE", or many others ways. Therefore, instead of accumulating responsibilities on a linear sequence of words, some embodiments of the invention count them on alternative parses, weighing observed counts with these parses' respective posterior probabilities, as further described below.

The resulting, optimized LMs, including for example merged or interpolated LMs created by embodiments of the invention and component LMs optimized by embodiments of the invention, offer significant improvements in speech recognition and understanding, machine translation, and other tasks where LMs are used. For example, these LMs are typically more compact, thereby improving efficiency. Additionally, they are capable of providing efficient decoding even for classes with large numbers of entities alleviating the need for large tagged corpora, and a mechanism for incorporating domain constraints during recognition, thereby improving the quality of input for downstream processing such as understanding. Further, such models facilitate staying updated as specific instances of entity-types change. For example, if a new movie comes out, only the definition of the movie entity class may need updating; the LM is capable of recognizing the movie and information related to the movie. Still further, these models facilitate analysis of the nature of the application domain, such as determining typical contexts of the entities (e.g., what words or phrases is the movie entity-type typically surrounded by).

As used herein, the term "token" (or unit) means one or more words, a phrase, or an entity. For example, consider the sentence, "Hi I am John Smith from North Carolina." (Capitalization or italics may be included in some instances herein for reading ease.) The phrase "hi I am" could include three or less tokens (e.g., one token for each word, tokens representing 2 or more words, or one token representing all three words). Similarly, "John Smith" could be two word tokens (for the words "John" and "Smith"), one entity token, or one phrase token (representing the phrase "John+Smith"). As used herein, the term "parse," as a noun, refers to a sequence of one or more tokens that represents a corpus.

Accordingly, at a high level, an iterative optimization algorithm is employed for determining the interpolation weights of component LMs, in an embodiment of the invention. Using initial values for the weights, a number of component LMs are interpolated and the resulting LM interpolation used to parse the sentences of a training corpus into a collection of alternative representations or parses, which may be referred to herein as a lattice of parses. In particular, a lattice represents a collection of parses (such as all possible parses or n-best) resulting from the component LMs, and may include some parses that will not be supported by some of the component LMs. Thus, in some embodiments, the lattice may be represented as a collection of alternative parses at n-best level. The parses comprise a path or sequence of "tokens" representing words, entities (or classes), or phrases in the training corpus. In some embodiments, the tokens comprise words only, or words and classes.

Corresponding posterior probabilities are determined for each parse, indicating the probability of the parse given the set of component LMs. Using these posterior probabilities, updated interpolation coefficients are determined that reflect contribution by the component LMs for each token n-gram relative to the sum of contributions of all component LMs towards the probability of that particular n-gram. The updated interpolation coefficients (or weights) are used with the component LMs to produce an updated (or retrained) LM interpolation that is further optimized for the target domain. In particular, this maximum likelihood solution to minimizing perplexity may be determined with respect to all possible parses that can account for input sequences, wherein an estimate of token n-gram probability may be constructed as a linear combination of the n-gram's probabilities in all of the component LMs. The updated LM interpolation may be used to determine alternative parsed representations of the corpus for a next iteration, and the probabilities and weights determined with these alternative parsed representations are used to update (retrain) the LM interpolation again.

With each iteration, alternative parsed representations of the training corpus are determined using the LM interpolation, and the LM interpolation is updated to reflect the updated weights determined in that iteration. In this way, the same sequences of words from the training corpus may be modeled as, for example, part of a phrase in one representation, separate words in another representation, or a named entity in yet another representation. Each iteration results in an LM interpolation that is further optimized for the domain of the training corpus. In an embodiment, the iterations proceed until convergence or until sufficient optimization is obtained, which may be determined when the perplexity is no longer being decreased with each iteration, in an embodiment. For example, a validation step may be performed by using the interpolated LM on a validation corpus in order to check if perplexity is improving. Once convergence is reached or once optimization is deemed satisfactory (such as upon determining that perplexity no longer decreases with each iteration, or that perplexity is no longer substantially decreasing with each iteration), in some embodiments, the component LMs may be merged, according to the optimized weights, into a single, combined LM, which may be deployed in an application scenario, such as for ASR on a user device, or may be otherwise provided. In particular, some embodiments of the invention can provide for a single, combined LM that may be formed from merging of a number of component LMs, which may include class-based LMs, with coefficient weights that may be context specific. In some other embodiments, the component LMs and their corresponding optimized weights may be provided for use by interpolation on the fly, or as needed, such as further described in connection to FIG. 2B.

In this way, embodiments of the invention can be understood to use an expectation maximization (EM) approach for optimization, wherein linear interpolation optimizes perplexity of a training set with respect to a collection of n-gram LMs linearly combined in the probability space. In particular, EM may be used to minimize perplexity of a joint LM with component LMs that may contain classes. Whereas typically during the expectation stage, EM counts contributions of the individual component LMs for the probabilities of n-grams in the corpus, and in the maximization stage, it sets the re-estimated weight of a component to be its averaged contributions over the entire corpus, here (as described previously), instead of accumulating responsibilities on a linear sequence of words, some embodiments of the invention count the accumulated responsibilities on alternative parses, weighing observed counts with these parses' respective posterior probabilities.

Turning now to FIG. 1, a block diagram is provided showing aspects of an example system architecture suitable for implementing an embodiment of the invention and designated generally as system 100. It should be understood that this and other arrangements described herein are set forth only as examples. Thus, system 100 represents only one example of a suitable computing system architecture. Other arrangements and elements (e.g., user devices, data stores, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, system 100 includes network 115 communicatively coupled to one or more user devices (e.g., items 102 and 104), storage 106, and language model trainer 120. The components shown in FIG. 1 may be implemented using one or more computing devices, such as computing device 600 described in connection to FIG. 6. Network 115 may include, without limitation, one or more local area networks (LANs) and/or wide area networks (WANs). Such networking environments are commonplace in offices, enterprise-wide computer networks, intranets, and the Internet. It should be understood that any number of user devices, storage components, and language model trainers may be employed within the system 100 within the scope of the present invention. Each may comprise a single device or multiple devices cooperating in a distributed environment. For instance, language model trainer 120 may be provided via multiple devices arranged in a distributed environment that collectively provide the functionality described herein. Additionally, other components not shown may also be included within the network environment.

Example system 100 includes user devices 102 and 104, which may comprise any type of user device capable of receiving input from a user. For example, in one embodiment, user devices 102 and 104 may be the type of computing device described in relation to FIG. 6 herein. By way of example and not limitation, a user device may be embodied as a personal data assistant (PDA), a mobile device, a laptop, a tablet, remote control, entertainment system, vehicle computer system, embedded system controller, appliance, consumer electronic device, or other electronics device capable of receiving input from a user. The input may be received by one of many different modalities, such as by way of example and not limitation, voice or sound, text, touch, click, gestures, the physical surroundings of the user, or other input technologies described in connection to FIG. 6. For instance, a user may utilize a search engine to input a query, intending to receive information highly relevant to the query. Or a user may use voice commands with a gaming system, television, etc. All of these forms of input, as well as others not specifically mentioned herein, are contemplated to be within the scope of the present invention. In some embodiments, user input and user input libraries from user devices 102 and 104 may be stored in storage 106.

Example user devices 102 and 104 are included in system 100 to provide an example environment wherein LMs (including interpolated LMs) created by embodiments of the invention may be used by one or more user devices 102 and 104. Although, it is contemplated that aspects of the optimization processes described herein may operate on one or more user devices 102 and 104, it is also contemplated that some embodiments of the invention do not include user devices. For example, aspects of these optimization processes may be embodied on a server or in the cloud. Further, although FIG. 1 shows two example user devices 102 and 104, a user may be associated with only one user device or more than two devices.

Storage 106 may store training material; entity definitions; information about parsed representations of corpora; statistical information including interpolation weights, which may be determined from statistics determining component 126; and LMs, which may include component LMs and interpolated LMs, which may be determined by language model interpolator component 128. In an embodiment, storage 106 comprises a data store (or computer data memory). Further, although depicted as a single data store component, storage 106 may be embodied as one or more data stores or may be in the cloud.

By way of example and not limitation, training material stored on storage 106 may include textual information collected, derived, or mined from one or more sources such as user queries, SMS messages, web documents, electronic libraries, books, user input libraries, or artificially collected or created samples, for example. Training material may be utilized and stored based on characteristics of a language model to be optimized. In one embodiment, training material comprises a collection of in-domain words, sentences or phrases, and may be referred to herein as a corpus.

Storage 106 may also store information about parsed representations of corpora (i.e., parses). In some embodiments, corpora parses are stored as a lattice structure, as further described in connection to parsing component 124 and parsed data 214 in FIG. 2A. Information about the parses may include tokens created from words, entities, or phrases of a corpus; statistics associated with the tokens and the parses; and tags, which may identify the token type. In some embodiments, tokens are tagged by parsing component 124 to represent a type of sequences of words, such as an entity-type (also referred to herein as an entity class). Tags facilitate naming and identifying a span or words that likely belong together. Thus, the example provided above, "i'd like to see movie up in the air in amc sixteen and then go home," may be represented as "i'd+like+to see movie MOVIE=up_in_the_air in THEATER=amc_sixteen and then go+home." The span of words "up-in-the-air" may be tagged and replaced by entity-type MOVIE with entity value "up_in_the_air." Similarly, "amc sixteen" may be tagged and replaced by entity-type THEATER with value "amc_sixteen". The sequence "i'd+like+to" and the sequence "go+home" may be tagged as phrases.

Entity definitions include information about one or more entities associated with entity-types. As used herein, the term "entity" is broadly defined to include any type of item, including a concept or object that has potential relationships with other items. For example, an entity might be the movie "Life is Beautiful," the director "Roberto Benigni," or the award "Oscar." Collections of entities carrying similar syntactic and/or semantic meaning comprise entity types (e.g. movie titles, songs, time expressions etc.). Furthermore, related entity types can be organized into domains. For instance, within the movie domain, the movie "Life is Beautiful" is directed by "Roberto Benigni," and the movie also won an Oscar.

In one embodiment, entity definitions comprise explicitly enumerated entity instances associated with an entity-type, such as a weighted list of alternatives (e.g., word tries) for a particular entity-type. For example, for the actor entity-type, entity definitions might include a list of actor names. In some embodiments, as described below, each actor name (or each instance of an entity) has a corresponding probability (statistical data), which may correspond to how popular (frequently occurring) the actor is, based on the training material. Thus, a particular instance of an entity for an entity-type may be determined based on the list of entities and probabilities.

Entity definitions may also comprise implicitly defined instances of entity-types. In particular, for certain entity-types, it is not efficient to explicitly enumerate all possible instances of the entity-type. For example, while all (or most) actors could be explicitly included in a definition for the actor entity-type, it is not efficient to enumerate all possible phone numbers, temporal information, such as dates and times, or other combinatorial entity-types. Therefore, in some embodiments, these entities may be implicitly defined by combinatorial models that can provide the entity definition. For example, a finite state machine (FSM) or similar model may be used. As with explicitly enumerated entity definitions, in some embodiments, implicitly enumerated entity instances have a corresponding probability (statistical data), which may correspond to how frequently occurring the entity instance is within the training corpus.

Language model trainer 120 comprises accessing component 122, parsing component 124, statistics determining component 126, and LM interpolation component 128. In one embodiment, language model trainer 120 may be implemented on one or more devices, such as user devices 102 and 104, on a server or backend computing system (not shown), or on a distributed platform (not shown) in the cloud. Language model trainer 120 is configured to determine and optimize interpolated LMs for in-domain applications. Language model trainer 120 and its components may reference a plurality of text data and/or information stored on storage 106 to implement embodiments of the invention, including the methods described in connection to FIGS. 3-5.

Language model trainer 120 and its components 122, 124, 126, and 128 may be embodied as a set of compiled computer instructions or functions, program modules, computer software services, or an arrangement of processes carried out on one or more computer systems, such as computing device 600 described in connection to FIG. 6, for example. Language model trainer 120, its components 122, 124, 126, and 128, functions performed by these components, or services carried out by these components may be implemented at appropriate abstraction layer(s) such as the operating system layer, application layer, hardware layer, etc., of the computing system(s). Alternatively, or in addition, the functionality of these components, Language model trainer 120, and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Continuing with FIG. 1, accessing component 122 is configured to access corpora of textual information, entity definitions, statistics information, and/or language models. Textual information (or text data) may comprise one or more letters, words, or symbols belonging to one or more languages, and may comprise language model training materials such as described in connection to storage component 106. In an embodiment, accessing component 122 accesses one or more entity definitions and an in-domain corpus of words. The one or more words may include stand-alone words, words comprising phrases, words in sentences, or a combination thereof. The accessed information might be stored in storage 106, memory, or other storage. Further, the information may be accessed remotely and/or locally.

Parsing component 124 is configured to generate alternative parsed representations of a corpus of textual information. Each parse includes a series of non-overlapping tokens representing the corpus. Each of the alternative parses represents the corpus using a different formation of tokens. For example, using the corpus "i'd like to see up in the air," one alternative parse would be "i'd+like+to", "see", "MOVIE=up_in_the_air". Another alternative parse would be "i'd+like", "to+see", "up+in", "the", "air". Each parse may have statistical data associated with it, which may be determined by statistics determining component 126 and used to produce new (or update an existing) LM interpolation weights by LM interpolation component 128.

Parsing component 124 uses statistical data associated with a component LMs to determine the alternative parses of the corpus. With each iteration of the optimization processes, alternative parsed representations of the corpus may be determined based on a LM interpolation, which may have been generated based on statistics associated with the parses from the previous iteration. In this way, the same sequences of words from the corpus may be modeled differently, such as a part of a phrase in one representation, separate words in another representation, or a named entity in yet another representation, with different alternative parses including these sequences determined from the LM components of the interpolation. In some embodiments, new parses are determined with each iteration, while in other embodiments all possible parses (or the most probable parses based on the statistical information) are determined initially, and then a subset of these are used in each iteration.

In an embodiment parsing component 124 determines a "lattice" data structure of nonlinear sequences of corpus elements. In particular, a lattice may represent a collection of parses (such as all possible parses or n-best) resulting from the LM components of the interpolation, and may include some parses that will not be supported by some of the component LMs. Thus, in some embodiments, the lattice may be represented as a collection of alternative parses at n-best level. The parses comprise a path or sequence of "tokens" representing words, entities (or classes), or phrases in the training corpus. In an embodiment, the lattice data structure comprises a directed graph providing a compact representation of a number of alternative parses. Each path through the lattice produces a different parse of the corpus, and each path is associated with a joint probability. One particular path (e.g., "i'd+like+to" "see" MOVIE, wherein MOVIE is an entity or class with value: Up In The Air (i.e., "MOVIE=up_in_the_air"), may be determined to have a higher probability than another path (e.g., "i'd+like" "to+see" "up+in" "the" "air").

In one embodiment, parsing component 124 may be embodied using trellis, where each position in a sentence corresponds to a trellis slice and states of the slide (contexts) represent: context n-gram history: previous (n−1) tokens in the parse and their word-lengths (e.g., phrase "i+live+in" followed by a 2-word long instance of entity STATE), and/or currently active entity, the state with this entity and its current length (if any; e.g., second word of phrase "i+live+in"). In some embodiments, parsing component 124 stores parse information in storage 106. Additional details regarding parsing are described in connection to FIG. 2A.

Statistics determining component 126 is generally determines probabilities, weights, and other statistical data used by LM interpolation component 128 for determining new or updated (i.e. further optimized) LM interpolations. By way of example and not limitation, such statistical data may include probabilities of a specific token, given a token history (i.e., tokens following each other); probabilities of token n-grams as a combination of the n-grams' probabilities in all of the component LMs; probabilities within tokens, such as the probability of a word(s) given a token (such as the probability of a specific instance given an entity-type); posterior probability of parses, indicating the probability of a parse given a set of component LMs; and/or interpolation weights reflecting the contribution by the component LMs for a token n-gram relative to the sum of contributions of all component LMs towards the probability of that particular n-gram. In some embodiments, statistical data determined by statistics determining component 126 may also include entity statistical data, or probabilities associated with entity definitions, as described above. In some embodiments, statistics determining component 126 may be configured to determine statistical data such as the frequency, occurrence, proximity or word distance between words or elements in the corpus or token; other probabilities associated with the tokens making up the parses and elements within the tokens, such as words or entity information or contributions that particular component LMs makes for a certain token, relative to the sum contributions of all component LMs towards the probability of the particular token n-gram; and/or posterior probabilities associated with the parses, which may indicate the probability of the parse, give the set of component LMs. This may include estimating the n-gram level probabilities for tokens used for component LMs and determining the maximum likelihood estimates for the n-gram probabilities.

In one embodiment, using a training corpus and entity definitions, statistics determining component 126 determines a first set of statistical data for an initial (or first) LM interpolation. This first set of statistical data comprises a first set of interpolation weights λ or "initialized" interpolation weights (which may comprise initialized values for the first iteration, and in one embodiment may be set as equal values according to a uniform distribution, initially) and statistical information for the component LMs, such as statistics associated with the entity definitions and statistical information determined from the training corpus. From this first set of statistical data, LM interpolating component 128 produces a first LM interpolation, as described below.

Additionally, from this first LM interpolation, parsing component 124 determines a first set of alternative parses comprising sequences of tokens representing the training corpus. Parsing component 124 may determine the first set of alternative parses using the first set of initialized interpolation weights and the probabilities corresponding to the LM components of the interpolation. In one embodiment, parsing component 124 generates a lattice of parses, with each parse associated with a joint probability, such as further described in FIG. 2A. Further, in some embodiments, for each of these parses, statistics determining component 126 is configured to determine a posterior probability, indicating the probability of a parse given a set of component LMs.

With the posterior probabilities of the parses, statistics determining component 126 is further configured to determine a second set of statistical data, which comprises a second set of interpolation weights $\lambda$, which may be considered new or updated interpolation weights for the component LMs. As described previously, these new interpolation weights $\lambda$ are further optimized for the target domain. In one embodiment, statistics determining component 126 is configured to determine the new interpolation weights $\lambda$ based on ratios of how much a particular component LM contributes for a certain n-gram relative to the sum of contributions of all LMs towards the probability of that particular n-gram, within a given iteration of the optimization process. Using this second set of statistical data, LM interpolation component 128 is configured to determine a second (a new) LM interpolation. In one aspect, the second LM interpolation may be considered an updated, optimized version of the first LM interpolation.

In further embodiments, the second LM interpolation may be used by parsing component 124 to determine a second set of alternative parses, from which statistical data (such as posterior probabilities of parses, and then updated interpolation weights) determined by statistics determining component 126 may be used by LM interpolation component 128 to produce a third LM interpolation. This description illustrates the iterative nature of embodiments described herein; where a plurality of sets of statistical data, component LMs, and sets of alternative parses or lattices may be generated to continually improve the current iteration of the LM interpolation by optimizing the interpolation weights for the corpus domain.

LM interpolation component 128 is configured to take the statistical data determined by statistics determining component 126 and determine an LM interpolation, which may comprise a new (updated) LM interpolation. In particular, the interpolation weights $\lambda$ determined by statistics determining component 126 may be applied to the component LMs for performing the interpolation by LM interpolation component 128. In this way, the component LMs are weighted by the interpolation weights (also referred to herein as interpolation coefficients). Through the iterative optimization processes described herein, these interpolation weights are optimized such that the interpolation or combination of the weighted component LMs is further optimized for the target domain. (In some embodiments, the end resulting optimized weights may be used with their corresponding component LMs for producing a single LM, formed by merging the component LMs, such as described in connection to FIG. 2A.)

In an embodiment, during the first iteration, LM interpolation component 128 may generate an initial LM interpolation using the component LMs and interpolation weights determined by statistics determining component 126. For a first iteration, these weights may be set to initial values, as described above. For example, in one embodiment, the weights are initialized to equal values (a uniform distribution of weights). From this first LM interpolation, a first set of parsed representations of the corpus may be determined, as described above, from which statistical data is determined and used to produce an updated LM interpolation. With each iteration of the optimizing process, the interpolation weights (determined by statistics determining component 126) are further optimized for the domain of the training corpus. In some embodiments, the newly determined interpolation weights update or replace the interpolation weights from a previous iteration. This updating or replacement of a previous set of interpolation weights with the newly determined weights may continue for multiple iterations of the optimization process, for example, until convergence or a set of statistical data associated with the model reaches an optimization threshold (for example, when the perplexity is no longer decreased with each iteration), and/or for a predetermined number of iterations.

Figure 2A:
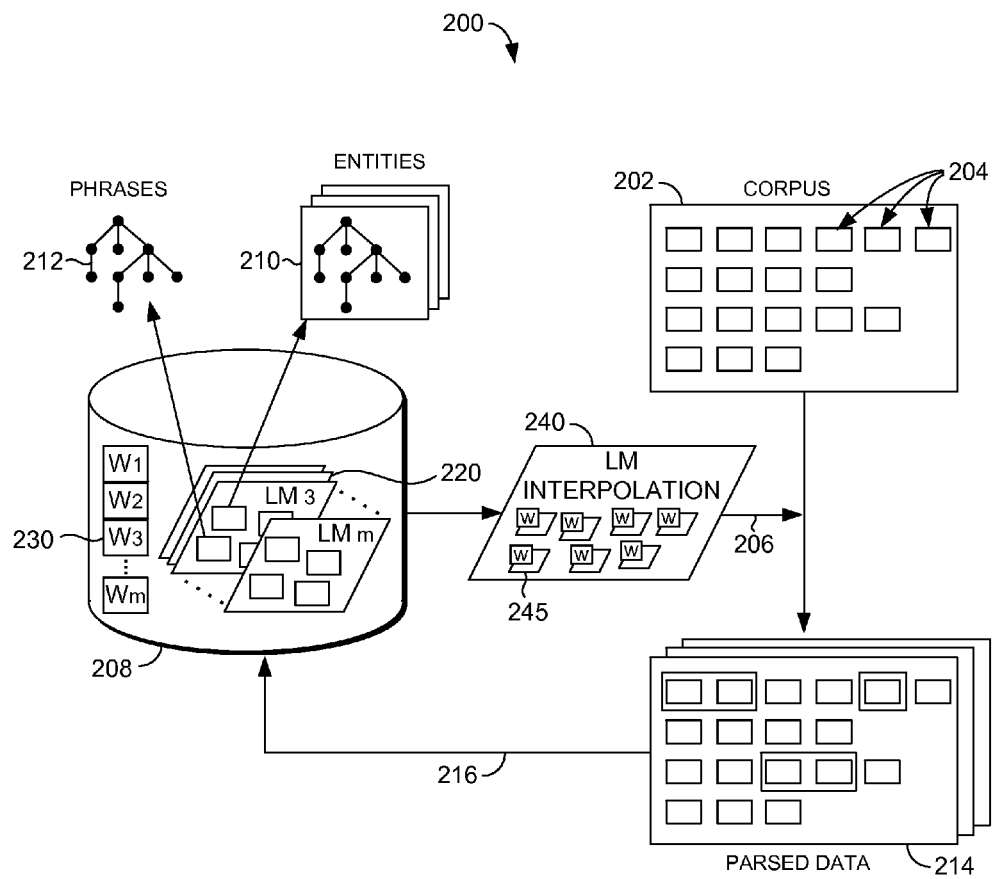
FIG. 2A depicts aspects of an iterative approach to determining and optimizing a language model interpolation in accordance with an embodiment of the invention.

Turning now to FIG. 2A, a perspective 200 is illustratively provided that depicts aspects of the iterative approach of an embodiment of determining and optimizing interpolated LMs. In this way, perspective 200 represents an example of a training scenario. Perspective 200 shows a storage component 208, LM interpolation 240, parsed data 214, and a corpus 202 of textual information comprising sequences of words 204. (For the sake of illustration, perspective 200 shows components outside of storage 208, it is contemplated that in some embodiments, corpus 202, LM interpolation 240, and parsed data 214 are also stored on one or more storage components such as storage 208.)

As shown in perspective 200, storage 208 (which may be embodied as a storage component 106 of FIG. 1) includes a number of component LMs 220 and interpolation weights 230 corresponding to the component LMs 220. In some embodiments, interpolation weights 230 comprise vectors $\lambda_m$, where m is the number of component LMs for interpolating. The interpolation weights $\lambda$ may be context independent $\lambda_m$ or context specific $\lambda_m(h)$ (wherein weights are optimized for a history h), as described previously.

In some embodiments, some of the component LMs may be associated with a set of entity definitions 210 and/or phrase definitions 212. Entity definitions and phrase definitions may include explicitly and/or implicitly defined entities and phrases. For example, a movie entity-type might explicitly enumerate every movie title with a corresponding probability (or weight) associated with each title; while a date, phone number, or other temporal expression may be defined by a combinatorial model, such as an FSM. The trie structure is shown in items 210 and 212 to indicate definitions of an entity-type or words or phrases that are generated out of component words.

In some embodiments, each component LM 220 may reflect specific subdomains or certain types of corpora, such as certain classes (e.g. personal names, locations, dates/times, movies, games, etc.) words or dictionaries, phrases, or combinations of these, such as token-based component LMs. Moreover, in some embodiments, component LMs may already be optimized for their respective subdomains. Thus, in these embodiments, a goal of the iterative optimization processes described herein is to determine the optimized weights to be applied to each component LM for combining the component LMs during interpolation or, ultimately, for merging them into a single LM, such as in the case of deployment, once the optimized weights are determined.

From the interpolation weights 230 and component LMs 220, LM interpolation 240 is determined. (In one embodiment, LM interpolation 240 is determined using LM interpolation component 128.) As shown, LM interpolation 240 is determined by interpolating a number or weighted component LMs 245, which may be determined by applying a particular weight 230 to a particular component LM 220. As described previously, the weights 230 may be context specific or context independent, and thus LM interpolation 240 may represent a context specific or context independent interpolation. Each component LM 245 may provide a probability of a particular token, given a sequence of tokens, which may be weighted according to the corresponding interpolation weight. Thus, in one embodiment, component LMs may be linearly interpolated by summing these weights, thereby forming a combined probability representing the weighted sum of the individual components.

According to the embodiment shown in perspective 200, from the corpus 202 and LM interpolation 240, each iteration of the optimization process applies an interpolated LM 240 at 206 to generate parsed representations 214 of the corpus (shown as parsed data 214). In an embodiment, Parsed data 214 comprises a collection of alternative representations or parses of the corpus, which is referred to as a lattice of parses. In particular, each parse in the corpus determined a particular component LM corresponds to a different path through a lattice, and thus each lattice path is associated with a joint probability. A lattice therefore represents a collection of parses (such as all possible parses or n-best) resulting from the component LMs, and may include some parses that will not be supported by some of the component LMs. (In some embodiments, the lattice may be represented as a collection of alternative parses at n-best level.) In particular, each component LM 245 induces its own lattice of valid alternative representations (parses) of the corpus, and thus parsed data 214 comprises a set or collection of lattices, in an embodiment.

Statistical data, including posterior probabilities of the parses and interpolation weights, determined in part from the parsed data 214 may be applied at 216 to update the LM interpolation weights 230, (which may be stored in storage 208). These updated LM interpolation weights 230 then may be used with the component LMs 220 to determine a new or updated LM interpolation 240, which may be used for reparsing corpus 202. This iterative process may continue, for example, until convergence or until perplexity is no longer decreasing with each iteration, as described herein. At this point, in some embodiments, the now optimized interpolation weights may be used to form a single unified LM, by merging the component LMs according to the interpolation weights. The merged LM may be deployed in an application setting, such as described in connection to FIG. 2B. Alternatively, in some embodiments, the component LMs and corresponding optimized weights may be stored and used as needed for interpolation on the fly. For example, the component LMs may be interpolated as needed during speech decoding or second-pass recording.

For the first iteration, initial values for interpolation weights 230 may be used for determining LM interpolation 240. In an embodiment, these initial values may be equal, representing a uniform distribution. In an embodiment where context-specific weights are used, interpolation weights 230 may be initialized based on the context independent weights. For example, where context independent weights are determined, the context independent weights may be used to seed the context dependent weights, which then may be optimized via the iterative optimization process, such as further described in connection with method 300 of FIG. 3.

The following non-limiting example illustrates an iterative process for determining optimized weights according to an embodiment shown in perspective 200. We begin by accessing a corpus 202, which may be stored in storage component (such as storage 208 or storage 106 of FIG. 1). In this example, corpus 202 comprises the sentence "hi I am john smith from north Carolina." (For the sake of clarity, corpus 202 includes only this sentence for the example, but it is contemplated that training corpora may include much larger bodies of textual information, in some embodiments.) During each iteration of the optimization process, corpus 202 is represented by alternative parses (which may be determined by parsing component 124) using component LMs 220. Each parse has a probability (which may be determined by statistics determining component 226), which is reflected in the component LM used to generate the parse.

In particular, each sentence or sequence of tokens in training corpus 202 (here, just one sentence), may be turned into a number of different parses (different representations, which may be represented by a lattice) by each of the component LMs, with each parse corresponding to a joint probability. (Joint probabilities may be estimated from the parses based on the component LMs and the interpolation weight $\lambda$ for each component LM, such as described in method 300 of FIG. 3. As described previously, for the first iteration, the interpolation weights $\lambda$ may be initialized to a value, such as an equal value for all weights or may be seeded based on previously determined weights.) For example, for a first component LM (referred to as "LM1") that understands personal names and has a vocabulary that includes the words in training corpus 202, LM1 may determine all (or n-best) possible parses of corpus 202. Thus LM1 might yield the following parses: (a1) a sequence of words: "hi I am john smith from north carolina"; (b1) a personal name surrounded by words: "hi I am PERSONAL_NAME=john_smith from north carolina"; (c1) another personal name (here, "carolina" is considered to be a personal name): "hi I am john smith from north PERSONAL_NAME=carolina"; and (d1) two personal names surrounded by words: "hi I am PERSONAL_NAME=john_smith from north PERSONAL_NAME=carolina". Here, parses (a1) through (d1) of LM1 comprise an example lattice that represents a collection of alternative interpretations of sequences of words.

Suppose a second component LM (referred to as "LM2") understands US state names and has the same vocabulary as LM1 and does not include the word "carolina" as a name, since LM2 is a class-based LM for understanding states. Accordingly, LM2 might yield the following single parse of the example corpus: (a2) "hi I am john smith from STATE=north_carolina". Suppose a third component LM (referred to as "LM3") understands US state names and personal names, and has the same vocabulary as LM1. LM3 might yield the following parses of the example corpus: (a3) a sequence of words: "hi I am john smith from north carolina"; (b3) words with a personal name: "hi I am PERSONAL_NAME=john_smith from north carolina"; (c3) another personal name: "hi I am john smith from north PERSONAL_NAME=carolina"; (d3) two personal names: "hi I am PERSONAL_NAME=john_smith from north PERSONAL_NAME=carolina"; (e3) a state: "hi I am john smith from STATE=north_carolina"; (f3) a personal name and a state: "hi I am PERSONAL_NAME=john_smith from STATE=north_carolina". Here again, parses (a3) through (f3) of LM3 comprise another example lattice that represents a collection of alternative interpretations of sequences of words. Additionally, for the sake of clarity, this example uses class-based component LMs, but component LMs that represent phrases or any combination of words, phrases or entities, may also be employed in some embodiments. (For example, a fourth component LM that recognizes words and phrases, might yield as one of its parses: "hi I+am john smith from north carolina", wherein the "I am" is parsed as a phrase "I+am".)

Accordingly, each of the different paths produced by LM1, LM2, and LM3 may be treated as an alternative path with a corresponding joint probability, from which a posterior probability may be determined (which may be determined using statistics determining component 126). So for example, it may be determined that path "a1" has a posterior probability of 0.2; path "b1" has a posterior probability of 0.15; . . . path "e3" has a posterior probability of 0.13; etc. (For the sake of clarity, the paths have been explicitly enumerated in this example. But it is contemplated that, in some embodiments, the posterior probabilities may be determined directly from the lattices.)

Figure 3:
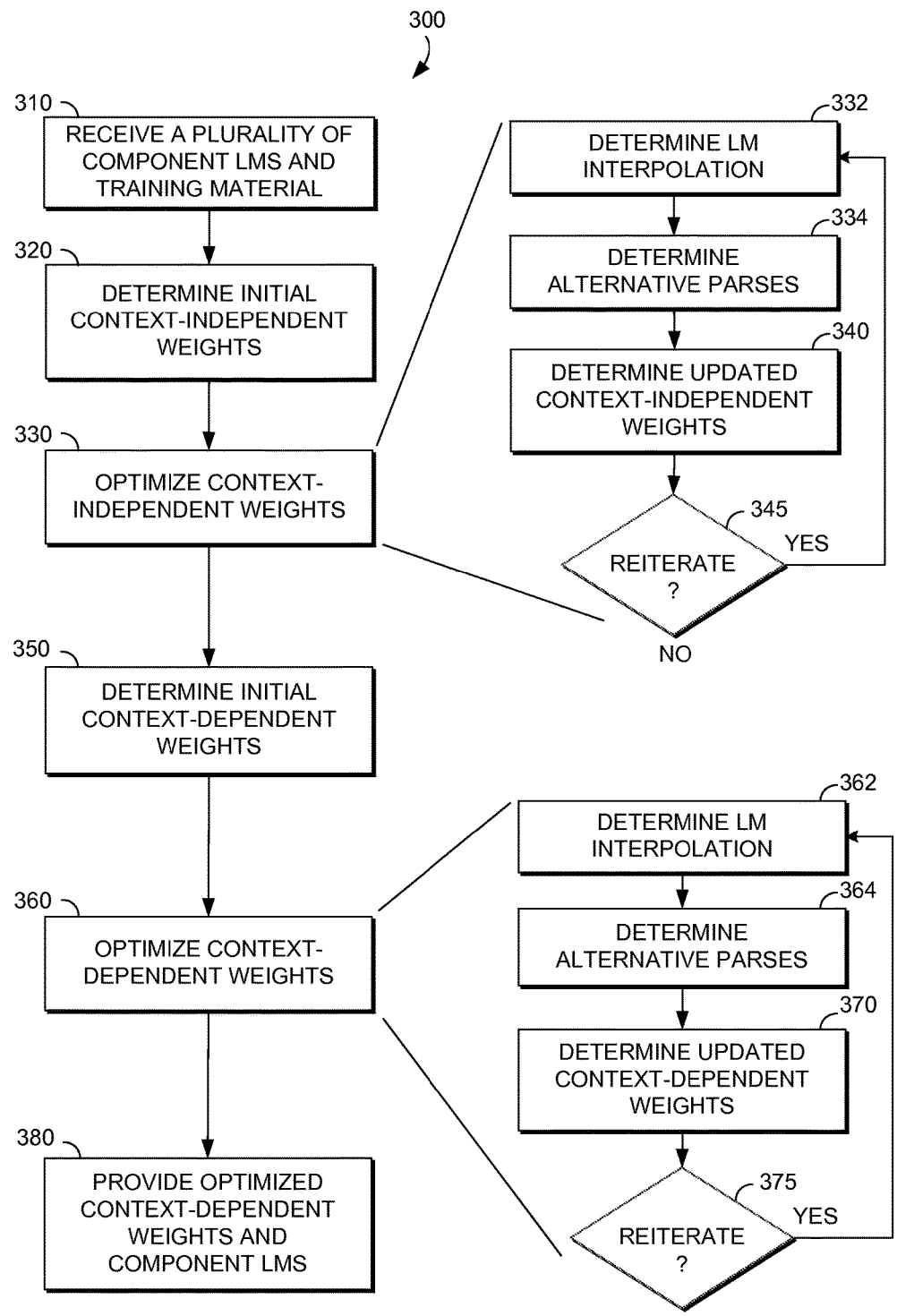
FIG. 3 depicts a flow diagram of a method for determining and optimizing an interpolated language model for a domain, in accordance with an embodiment of the present invention.

Using the posterior probabilities, we determine sufficient statistics based on the parses for determining new (or updated) weights $\lambda_m$. In an embodiment, the weights are based on certain statistics (are also referred to herein as "responsibilities") representing a ratio of the contribution by a particular component LM (such as component LM 245) for a certain token n-gram relative to the sum of the contributions or all component LMs towards probability of that particular token n-gram. In some embodiments, these proportions given by the ratios are weighted according to the posterior probabilities, such as described in connection to method 300 (FIG. 3).

The new (or updated) weights $\lambda_m$ then may be used with the component LMs to determine an LM interpolation 240, which may be used in a subsequent iteration at 206 for parsing corpus 202 again, and determining joint probabilities, which may be determined in part from the updated weights $\lambda_m$. With each iteration, the newly determined weights $\lambda_m$ become further optimized. With each iteration (or periodically during the iterative process), it may be determined whether sufficient optimization has been reached. For example, in an embodiment, iterations continue until the interpolation weights converge on the training corpus. Alternatively, in some embodiments, overtraining may be avoided by only iterating until sufficient optimization is reached. For example, in some embodiments, a validation step may be performed with each iteration (or periodically) that checks to see if the current iteration is better than the previous one; in particular, whether perplexity is still being decreased (or sufficiently decreased) with each iteration. In one embodiment, a validation corpus may be used to check the change in perplexity.

In some embodiments, only a limited number of parses are produced with each iteration, after the first iteration, based on the probabilities associated with the parses. For example, in one embodiment, all possible parses of a sentence may be implicitly ranked at each iteration by probability so that the more probable parses come to the top and can be explicitly enumerated (n-best). Moreover, in practice, parses in the later iterations may not be present in the alternative parses determined in earlier iterations.

Figure 2B:
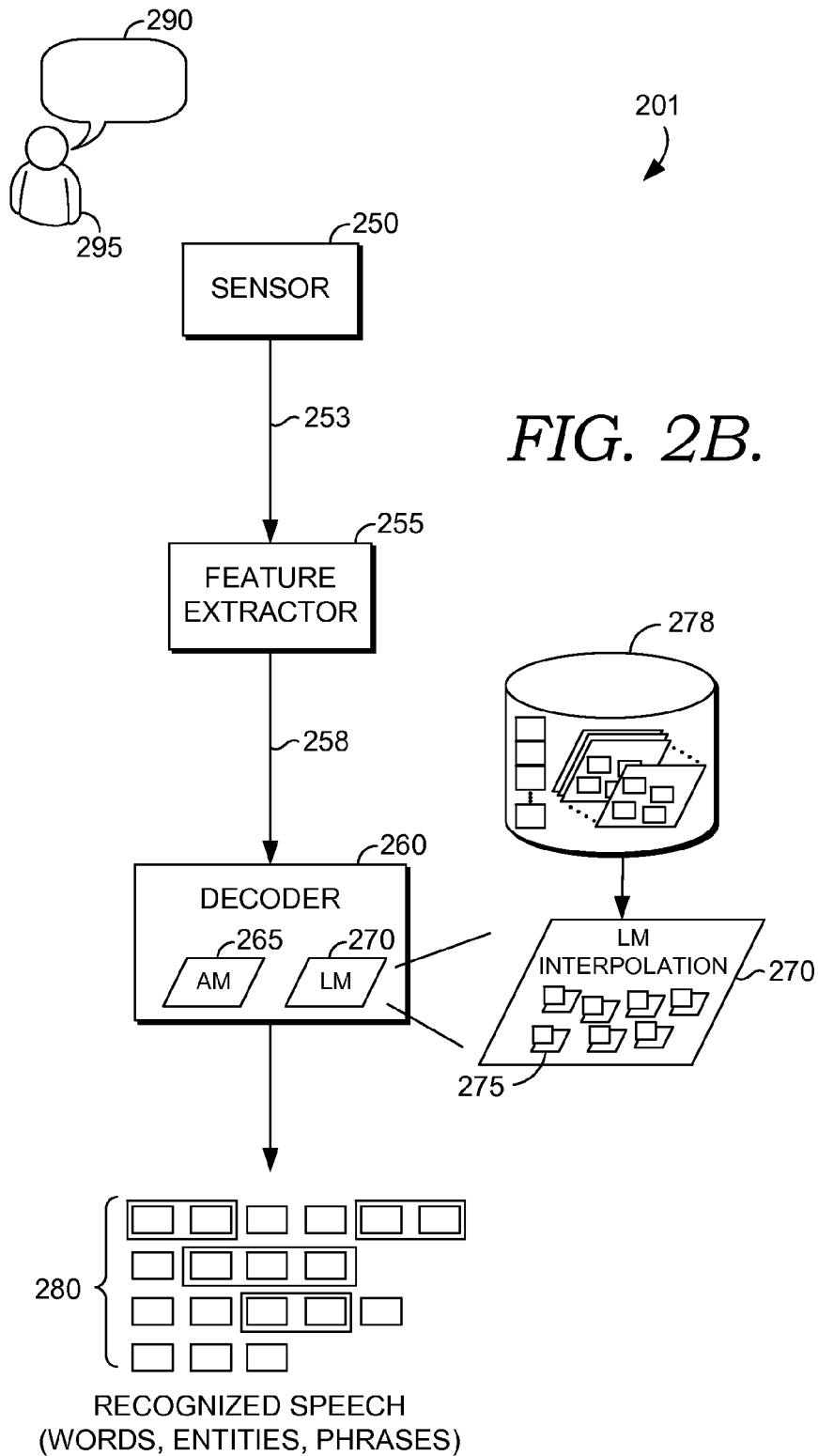
FIG. 2B depicts aspects an example deployment of one embodiment of the invention in an automatic speech recognition system.

Turning now to FIG. 2B, a perspective 201 is illustratively provided that depicts an example LM interpolation, which may be determined according to the iterative processes described in connection to FIG. 2A, shown in an application scenario. More specifically, perspective 201 depicts an example of automatic speech recognition (ASR) system according to an embodiment of the invention. The ASR system shown in FIG. 2B is just one example of a ASR system that is suitable for using with an LM (such as an interpolated LM determined as described in FIG. 2A) for determining recognized speech. It is contemplated that other variations of ASR systems may be used including ASR systems that include fewer components than the example ASR system shown here, or additional components not shown in FIG. 2B. Thus one purpose of FIG. 2B is to provide an example of an ASR system that may use interpolated LMs according to embodiments of the invention described herein.

Perspective 201 shows a sensor 250 that senses acoustic information (audibly spoken words or speech 290) provided by a user-speaker 295. Sensor 250 may comprise one or more microphones or acoustic sensors, which may be embodied on a user device (such as user devices 102 or 104, described in FIG. 1). Sensor 250 converts the speech 290 and into acoustic signal information 253 that maybe provided to a feature extractor 255 (or may be provided directly to decoder 260, in some embodiments). In some embodiments, the acoustic signal may undergo pre-processing (not shown) before feature extractor 255. Feature extractor 255 generally performs feature analysis to determine the parameterize useful features of the speech signal while reducing noise corruption or otherwise discarding redundant or unwanted information. Feature extractor 255 transforms the acoustic signal into a features 258 (which may comprise a speech corpus) appropriate for the models used by decoder 260.

Decoder 260 comprises an acoustic model (AM) 265 and a language model (LM) 270. AM 265 comprises statistical representations of distinct sounds that make up a word, which may be assigned a label called a "phenome." AM 265 models the phenomes based on the speech features and provides to LM 270 a corpus comprising a sequence of words corresponding to the speech corpus. LM 270 receives the corpus of words, and determines a recognized speech 280, which may comprise words, entities (classes) or phrases.

As shown in perspective 201, LM 270 comprises a LM interpolation formed from a number of component LMs 275 and corresponding interpolation weights. Embodiments of LM 270 may be determined and optimized as described in FIG. 2A. Component LMs and optimized interpolation weights may be stored on storage 278. Additionally, as described in connection to FIG. 2A, the component LMs may include class-based LMs, and the LM interpolation may be context-specific or context-independent. Further, although LM 270 is depicted as an LM interpolation, in some embodiments of the ASR system, LM 270 comprises a single, unified language model that may be generated by merging the component LMs according their corresponding optimized interpolation weights. In one embodiment, a static merge is performed with the LM components. Alternatively, in some embodiments, LM interpolation 270 may be determined as needed, on the fly, from the component LMs 275 and their corresponding optimized interpolation weights. Thus either scenario (interpolation on the fly, or merged into a single LM) may be used in the example ASR system depicted in perspective 201.

Turning to FIG. 3, a flow diagram is provided illustrating one example method 300 for determining and optimizing a language model interpolation. An interpolated language model determined according to method 300 is suitable for use in an application domain represented by a training corpus that is used to optimize the interpolation. At a high level, example method 300 first determines and optimizes a set of context-independent interpolation weights, and then uses those weights to determine and optimize a set of context-specific interpolation weights. Thus, in this example embodiment, two iterative processes are performed (one for optimizing each set of interpolation weights). It is contemplated that some embodiments only optimize the independent weights (and thus cease after step 330 of method 300), while some other embodiments may only include determining and optimizing a set of context-specific weights (and thus begin at step 350, with initialized values, which may be pre-defined, for the context-specific weights).

Accordingly, at step 310, a plurality of component LMs and training material are received. In one embodiment, training material comprises a training corpus of textual information. The training material may also comprise a set of entity definitions, in some embodiments. The textual information may comprise one or more alphanumeric characters, or words, which may be in sentences, or other sequences of alphanumeric character strings. In one embodiment, the training material may be received from one or more sources including user queries, SMS messages, web documents, electronic libraries, books, user input libraries, or artificially collected or created samples, for example. In one embodiment, the training material defines a domain and in one embodiment is related to a structured application domain; for example, a home entertainment system, personal device, or vehicle.

Step 310 also receives a plurality of component LMs. The component LMs may be pre-defined, in some embodiments and may be received from storage. The component LMs are referred to as "component" language models because the LMs are used as components of determining a LM interpolation. In some embodiments, at least some of the component LMs may be class-based and/or capable of determining words phrases, and entity n-grams (so called WPE language models that unify words, phrases and entities into a single statistical framework). Some component LMs may reflect specific subdomains or certain types of corpora, such as certain classes (e.g. personal names, locations, dates/times, movies, games, etc.) words or dictionaries, phrases, or combinations of these, such as token-based component LMs. Moreover, in some embodiments, component LMs may already be optimized for their respective subdomains.

In some embodiments, one or more of the component LMs may be determined in step 310. For example, a component LM may be created from statistical data determined from the training corpus, at a word-level, and entity definitions. The statistical data underlying the language model creation for the first iteration can be initialized from word-n-gram powersets in all phrases of the word-level training corpus. In one embodiment, entity definitions may be seeded with weighted lists or grammars, which may be uniformly distributed, and phrases may be automatically identified in the corpus based on their occurrence statistics.

At step 320, initial content-independent weights are determined. Context-independent weights comprise interpolation weights used for performing LM interpolation that is context-independent. As described in connection to FIGS. 1, 2A and 2B, interpolation weights may be initialized and then optimized via an iterative optimization process (such as in steps 332 through 345 of method 300). In an embodiment, a set of context-independent weights are initialized to have equal values (uniform distribution) in step 320. In some embodiment, this value may be pre-determined, or may be estimated based on the component LMs.

At step 330, the context-independent weights are optimized. Some embodiments of step 330 comprise an iterative optimization process for determining optimized interpolation weights such as described herein, and may be carried out in steps 332 to 345 of method 300. Thus step 330 provides a set of interpolation weights for the component LMs that are context-independent.

Steps 332 through 345 provide embodiments of an iterative optimization process for determining optimized values for the context-independent interpolation weights corresponding to step 330. Some embodiments of this iterative optimization process are further described in connection to FIGS. 1 and 2A. As described previously, a goal of the interpolation and optimization process is to determine optimized interpolation weights $\lambda_m$ so as to minimize perplexity of the resultant interpolated LM on an in-domain sample corpus. Accordingly, some embodiments of steps 332 through 345 may be understood as applying an EM approach to the optimization, wherein linear interpolation optimizes perplexity of a training set with respect to the collection of component LMs linearly combined in the probability space.

At step 332, an LM interpolation is determined. The LM interpolation may be determined from the component LMs and the context-independent interpolation weights, which for a first iteration may be the initialized context-independent weights determined in step 320, or may have been determined in step 340 in subsequent iterations. Thus using the initial or current values for the interpolation weights, a number of component LMs are interpolated and the resulting LM interpolation used in step 334 to parse a corpus of the training material into a collection of alternative representations or parses.

At step 334, a set of alternative parses are determined from the training material corpus using the interpolated LM determined in step 332. A parse may comprise a path or sequence of tokens representing words, entities (or classes), and/or phrases in the training corpus. In some embodiments the set of alternative parses determined in step 334 comprises a set of lattices, which may represent all possible parses or n-best, resulting from the component LMs, and may also include some parses that will not be supported by some of the component LMs. Thus each path through a lattice corresponds to a different parse of the corpus, and each path is associated with a joint probability.

In some embodiments of step 334, only a limited number of parses are produced for each iteration, after the first iteration, based on the probabilities associated with the parses. For example, in one embodiment, all possible parses of a sentence may be ranked at each iteration by probability so that the more probable parses come to the top (n-best).

The alternative parsed representations of the corpus may be determined using the statistical data reflected in the component LMs, as described herein, with each parse comprising a sequence of one or more tokens that together represent the corpus. In particular, consider a corpus W of sentences w with normalized weights L'(w) and alternative parses $c^k$ in terms of tokens $c_j^k$ that induce segmentations $\pi_i^k$. By way of example, for a sentence w given as "flight from boston to new York at three p m," segmentations $\pi^k$ may be "flight from," "boston," "to," "new york," "at," "three p m," and a parse comprising words, classes and possibly phrases may be determined as "flight+from CITY=boston to CITY=new_york at TIME=three_p_m." (In this example parse, "flight+from" is a phrase, CITY and TIME are classes, and "to" and "at" are words.) By construction, the token-level vocabulary of the interpolated LM determined in step 332 may be defined as a union of the vocabularies of the individual component LMs, and the class definitions will be also be shared. Applied to the individual sentences w, the interpolated LM produces K≥0 alternative parses (token-level representations) $c^k$ with $k=\overline{1,K}$. For instance, the example sentence described in connection to FIG. 2A may be parsed as just a sequence of words (e.g., "hi I am john smith from north carolina"), as a combination of words and entities or classes (e.g., "hi I am PERSONAL_NAME=john_smith from STATE=north_ carolina"), as a combination of words, classes, and phrases (e.g., "hi I+am PERSONAL_NAME=john_smith from STATE=north_carolina," where "I+am" is a phrase), or in many other ways (e.g., "hi+I+am PERSONAL_NAME=john_smith from north PERSONAL NAME=north_carolina").

From the set of alternative parses, joint probabilities P(w, c) may be estimated based on the component LMs and a vector $\lambda$ of interpolation coefficients $\lambda_m$ (one for each LM component m). Given a token-level history $h_i^k$ that precedes $c_i^k$, the joint probabilities may be determined as:

$$P(w, c) = \prod_{c_i \in c} \left( P(\pi_i | c_i) \sum_m \lambda_m P_m(c_i | h_i) \right) \quad (A1)$$

For the first iteration, the initial values of interpolation coefficients $\lambda_m$ determined (as initial context independent weights) in step 320 are used in Equation (A1); for each subsequent iteration, the updated context independent weights determined in step 340 are used for $\lambda_m$ in Equation (A1).

At step 340, updated context-independent weights are determined. In some embodiments, step 340 comprises determining sufficient statistics on the parses determined in step 334. In particular, in one embodiment of step 340, based on the joint probabilities determined for the parses, corresponding posterior probabilities $P(c^k|w)$ are determined for each of the parses, indicating the probability of the parse given the set of component LMs, as:

$$P(c^k | w) = \frac{P(w, c^k)}{\sum_c P(w, c)} \quad (A2)$$

With these posterior probabilities, updated interpolation coefficients $\lambda$ may be determined that reflect contribution by the component LMs for each token n-gram relative to the sum of contributions of all component LMs towards the probability of that particular n-gram. In particular, updated values for context-independent weights $\lambda$ may be determined as:

$$\lambda_m = \frac{1}{\gamma(h)} \sum_w L'(w) \sum_{k:h \in c^k} \left( P(c^k | w) \sum_{i:h_i^k=h} S_{i,m}^k(w, h) \right) \quad (A3)$$

where $$S_{i,m}^k(w, h) := \frac{P_m(c_i^k | h) \lambda_m}{\sum_{m'} P_{m'}(c_i^k | h) \lambda_{m'}} \quad (A4)$$

is the contribution that a particular LM component has for a token in a given fixed history on a specific parse of the training material corpus, using the previous (or initial) values for $\lambda_m$, where $\lambda_{m'}$ is the sum over all of the component LMs. The normalization coefficient $\gamma(h)$, given as:

$$\gamma(h) = -\sum_w L'(w) \sum_{k:h \in c^k} (P(c^k | w) \# h |_{c^k}) \quad (A5)$$

(where $\#|_c$ signifies counting along parse c), represents the expected number of times history h has been observed in the training material corpus.

The updated interpolation weights determined in step 340 may be used with the component LMs to produce an updated (or retrained) LM interpolation that is further optimized for the target domain. The updated LM interpolation may be used to determine alternative parsed representations of the corpus for a next iteration, and the probabilities and weights determined with these alternative parsed representations are used to update (or retrain) the LM interpolation again.

At step 345, it is determined whether to continue iterating the optimization of step 330. With each iteration, the newly determined interpolation weights $\lambda_m$ (determined in step 340) become further optimized for the training material. Thus in embodiments of step 330, the iterations of steps 332 through 340 may proceed until convergence or until optimization is determined to be sufficient or otherwise deemed satisfactory.

In an embodiment, overtraining may be avoided by only iterating until sufficient optimization is reached. For example, for each iteration (or at times during the iterative process, such as every several iterations of after a minimum number of iterations have transpired, for example), it may be determined whether sufficient optimization has been attained. In particular, in one embodiment, a validation step may be performed that checks to see if the current iteration is better than the previous one, such as by determining whether perplexity is still being decreased (or is sufficiently decreasing) with each iteration. In some embodiments, a window of iterations may be used for determining whether perplexity is no longer decreasing and therefore the iterations should cease. In one embodiment, a validation corpus may be used to check the change in perplexity and/or a threshold may be used to determine whether the decrease in perplexity, resulting from each iteration, is sufficient.

If it is determined that another iteration is to be performed, then method 300 returns to step 332, wherein an (updated) context-independent LM interpolation is determined according to the updated interpolation weights determined in step 340. On the other hand, if the optimization is determined to be satisfactory (or if convergence is determined) then method 300 proceeds to step 350, wherein the updated context-independent weights determined (in step 340) during the final iteration of step 330, may be provided as optimized context-independent weights.

At step 350, initial content-dependent (or context-specific) weights are determined. The context-specific weights comprise interpolation weights used for performing LM interpolation that is context-dependent. (As described herein, interpolation weights may be initialized and then optimized via an iterative optimization process, such as in steps 362 through 375 of method 300). In some embodiments of step 350, a set of context-specific weights $\lambda(h)$ are determined from using the optimized context-independent weights (determined in step 330) as seeds. For example, in one embodiment, for each of the component LMs, the corresponding context-specific weights for a particular component LM may be set to the value of the optimized context-independent weight that corresponds to that component LM, as determined in step 330. Alternatively, in some embodiments of step 350, the context specific weights $\lambda(h)$ may be determined in a manner similar to determining the context-independent weights in step 320, such as by setting the weights with equal values (a uniform distribution).

At step 360, the context-dependent weights are optimized. Some embodiments of step 360 comprise an iterative optimization process for determining optimized interpolation weights (as provided in steps 362 through 375) similar to the iterative process of step 330, except that the weights are context specific. Additionally, some embodiments of this iterative optimization process are further described in connection to FIGS. 1 and 2A. Accordingly, step 360 thus provides a set of interpolation weights for the component LMs that are context-specific.

As described previously, a goal of the interpolation and optimization process is to determine optimized interpolation weights $\lambda_m$ so as to minimize perplexity of the resultant interpolated LM on an in-domain sample corpus. Accordingly, some embodiments of steps 362 through 375 may be understood as applying an EM approach to the optimization, wherein linear interpolation optimizes perplexity of a training set with respect to the collection of component LMs linearly combined in the probability space.

At step 362, a context-specific LM interpolation is determined. The LM interpolation may be determined from the component LMs and the context-dependent interpolation weights, which for a first iteration may be the initialized weights determined in step 350, or may have been determined in step 370 in subsequent iterations. Thus using the initial or current values for the interpolation weights, a number of component LMs are interpolated and the resulting LM interpolation used in step 364 to parse a corpus of the training material into a collection of alternative representations or parses.

At step 364, a set of alternative parses are determined from the training material corpus using the interpolated LM determined in step 362. As with step 334, a parse may comprise a path or sequence of tokens representing words, entities (or classes), and/or phrases in the training corpus, and in some embodiments, the set of alternative parses determined in step 364 comprises a set of lattices, which may represent all possible parses or n-best, resulting from the component LMs, and may also include some parses that will not be supported by some of the component LMs. Thus each path through a lattice corresponds to a different parse of the corpus, and each path is associated with a joint probability.

In some embodiments of step 334, only a limited number of parses are produced for each iteration, after the first iteration, based on the probabilities associated with the parses. For example, in one embodiment, all possible parses of a sentence may be ranked at each iteration by probability so that the more probable parses come to the top (n-best).

The alternative parsed representations of the corpus may be determined using the statistical data reflected in the component LMs, as described herein, with each parse comprising a sequence of one or more tokens that together represent the corpus. In particular, consider again a corpus W of sentences w with normalized weights L'(w) and alternative parses $c^k$ in terms of tokens $c_i^k$ that induce segmentations $\pi_i^k$. By construction, the token-level vocabulary of the interpolated LM determined in step 362 may be defined as a union of the vocabularies of the individual component LMs, and the class definitions will be also be shared. Applied to the individual sentences w, the interpolated LM produces K≥0 alternative parses (token-level representations) $c^k$ with k=$\overline{1,K}$.

From the set of alternative parses, joint probabilities P(w, c) may be estimated based on the component LMs and the vector $\lambda$(h) of context-specific interpolation coefficients (weights) $\lambda_m$(h) (one for each LM component m). Given a token-level history $h_i^k$ that precedes $c_i^k$, the joint probabilities may be determined as:

$$P(w, c) = \prod_{c_i \in c} \left( P(\pi_i \mid c_i) \sum_m \lambda_m(h_i) P_m(c_i \mid h_i) \right) \quad (B1)$$

For the first iteration, the initial values of interpolation coefficients $\lambda_m(h_i)$ determined (as initial context-dependent weights) in step 350 are used in Equation (B1); for each subsequent iteration, the updated context-dependent weights determined in step 370 are used for $\lambda_m(h_i)$ in Equation (B1).

At step 370, updated context-dependent weights are determined. In some embodiments, step 370 comprises determining sufficient statistics on the parses determined in step 364. In particular, in one embodiment of step 370, based on the joint probabilities determined for the parses, corresponding posterior probabilities $P(c^k, w)$ are determined for each of the parses, indicating the probability of the parse given the set of component LMs, as:

$$P(c^k \mid w) = \frac{P(w, c^k)}{\sum_c P(w, c)} \quad (B2)$$

With these posterior probabilities, updated interpolation coefficients $\lambda$(h) may be determined that reflect contribution by the component LMs for each token n-gram relative to the sum of contributions of all component LMs towards the probability of that particular n-gram. In particular, updated values for context-independent weights $\lambda$(h) may be determined as:

$$\lambda_m(h) = \frac{1}{\gamma(h)} \sum_w L'(w) \sum_{k:h \in c^k} \left( P(c^k \mid w) \sum_{i:h_i^k = h} S_{i,m}^k(w, h) \right) \quad (B3)$$

where $$S_{i,m}^k(w, h) := \frac{P_m(c_i^k \mid h)\lambda_m(h)}{\sum_{m'} P_{m'}(c_i^k \mid h)\lambda_{m'}(h)} \quad (B4)$$

is the contribution that a particular LM component has for a token in a given fixed history on a specific parse of the training material corpus, using the previous (or initial) values for $\lambda_m$, where $\lambda_{m'}$ is the sum over all of the component LMs. The normalization coefficient $\gamma$(h), given as:

$$\gamma(h) = -\sum_w L'(w) \sum_{k:h \in c^k} (P(c^k \mid w) \# h \mid_{c^k}) \quad (B5)$$

(where $\#|_c$ signifies counting along parse c), represents the expected number of times history h has been observed in the training material corpus.

The updated interpolation weights determined in step 370 may be used with the component LMs to produce an updated (or retrained) LM interpolation that is further optimized for the target domain. The updated LM interpolation may be used to determine alternative parsed representations of the corpus for a next iteration, and the probabilities and weights determined with these alternative parsed representations are used to update (or retrain) the LM interpolation again.

At step 375, it is determined whether to continue iterating the optimization of step 360. With each iteration, the newly determined interpolation weights $\lambda_m(h)$ (determined in step 370) become further optimized for the training material. Thus in embodiments of step 360, the iterations of steps 362 through 370 may proceed until convergence or until optimization is determined to be sufficient or otherwise deemed satisfactory.

In an embodiment, overtraining may be avoided by only iterating until sufficient optimization is reached. For example, for each iteration (or at times during the iterative process, such as every several iterations of after a minimum number of iterations have transpired, for example), it may be determined whether sufficient optimization has been attained. In particular, in one embodiment, a validation step may be performed that checks to see if the current iteration is better than the previous one, such as by determining whether perplexity is still being decreased (or is sufficiently decreasing) with each iteration. In one embodiment, a window of iterations may be used for determining whether perplexity is no longer decreasing and therefore the iterations should cease. In one embodiment, a validation corpus may be used to check the change in perplexity and/or a threshold may be used to determine whether the decrease in perplexity, resulting from each iteration, is sufficient.

If it is determined that another iteration is to be performed, then method 300 returns to step 362, wherein an (updated) context-specific LM interpolation is determined according to the updated interpolation weights determined in step 370. On the other hand, if the optimization is determined to be satisfactory (or if convergence is determined) then method 300 proceeds to step 380, wherein the updated context-dependent weights determined (in step 370) during the final iteration of step 360, may be provided as optimized context-dependent weights.

At step 380, the optimized context-dependent weights and component LMs are provided. In some embodiments of step 380, the optimized context-dependent weights and component LMs may be provided for deployment in an application setting, such as for use in an ASR system implemented on (or across) a user device, server, or backend computing device. In some embodiments, the component LMs may be interpolated (according to the optimized context-dependent weights) on the fly, as needed in a real-time application scenario. Alternatively, in some embodiments the optimized context-dependent weights and component LMs provided in step 380 may be combined into a single, unified LM (such as by merging the component LMs according their corresponding optimized interpolation weights). This unified LM, which is context dependent, may be formed from component LMs that include class-based LMs (or LMs compatible with the WPE framework, described previously).

Figure 4:
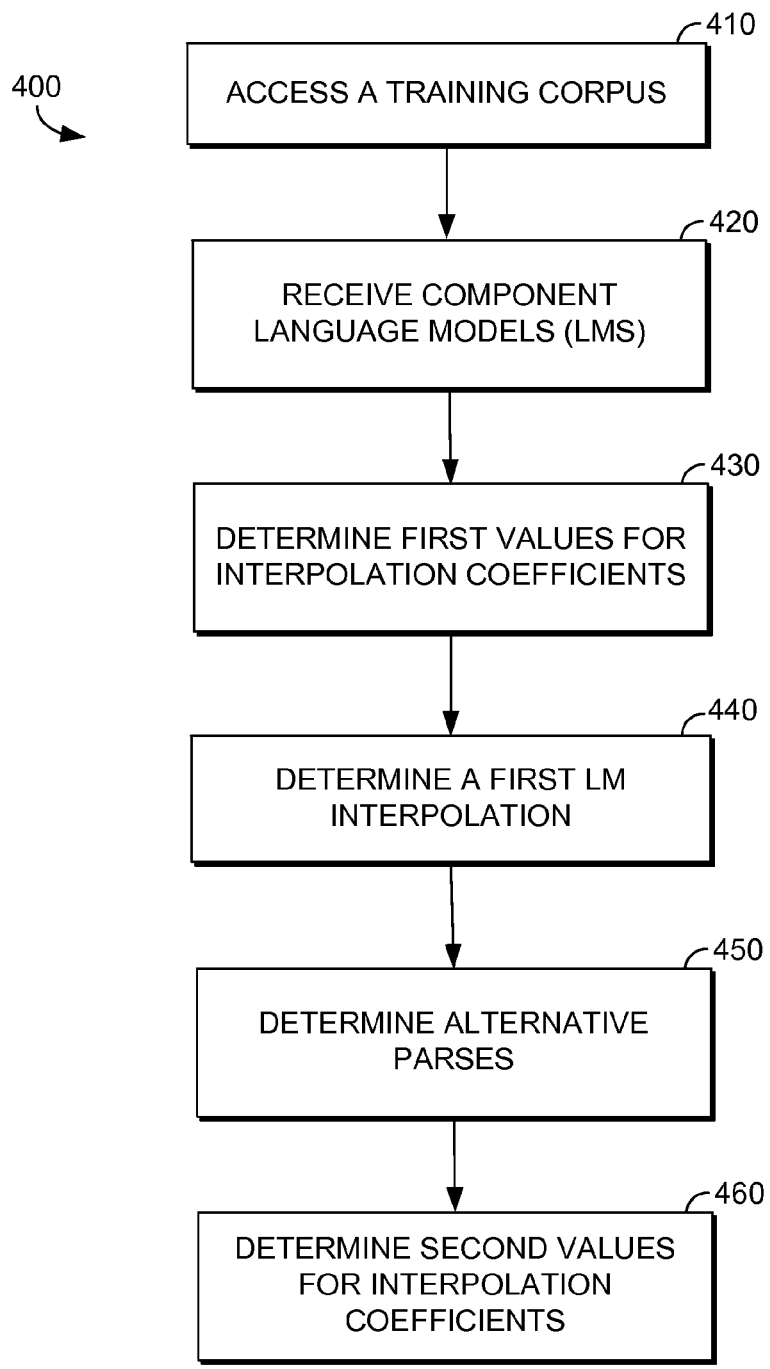
FIG. 4 depicts a flow diagram of a method for determining an optimized LM interpolation, in accordance with an embodiment of the present invention.

Turning now to FIG. 4, a flow diagram is provided illustrating one exemplary method 400 for determining an optimized LM interpolation. An interpolated language model determined according to method 400 may be optimizes for in-domain application based on a training corpus. At step 410, the training corpus is accessed. In an embodiment, the training corpus comprises text data, for example one or more alphanumeric characters or words, which may be in sentences, or other sequences of alphanumeric character strings. The training corpus may be accessed from a data store or may be created, mined, or derived from one or more sources such as user queries, SMS messages, web documents, electronic libraries, books, user input libraries, or artificially collected or created samples, for example.

At step 420, a plurality of component LMs are received. The component LMs may be pre-defined, in some embodiments and may be received from storage, such as storage 106 or 208. In some embodiments, at least some of the component LMs may be a class-based model and/or capable of determining words phrases, and entity n-grams (referred to herein as WPE language models, which unify words, phrases and entities into a single statistical framework). Some component LMs may reflect specific subdomains or certain types of corpora, such as certain classes (e.g. personal names, locations, dates/times, movies, games, etc.) words or dictionaries, phrases, or combinations of these, such as token-based component LMs. Moreover, in some embodiments, component LMs may be optimized for their respective subdomains. In some embodiments, one or more of the component LMs may be determined in step 420. For example, a component LM may be created from statistical data determined from the training corpus, at a word-level, and entity definitions.

At step 430, first values for interpolation coefficients are determined. In some embodiments, the first values for interpolation coefficients comprise initial values, and in some embodiments, the first values comprise values, which may be determined from a previous iteration of a process for determining optimized values for the interpolation coefficients. As described herein, interpolation coefficients may be applied as interpolation weights for the component LMs during interpolation. Thus a component LM has a corresponding interpolation coefficient, in some embodiments, which may be embodied as a vector and may be context-independent or context specific. As described in connection to FIGS. 1, 2A and 2B, these interpolation weights may be initialized and then optimized via iterative optimization processes. In some embodiments of step 430, initial values for the interpolation coefficients are determined as equal (uniform distribution). This initial value may be pre-determined, or may be estimated based on the component LMs. In some embodiments of method 400 that perform context-specific interpolation, the initial values for the interpolation coefficients may be determined by seeding using optimized context-independent weights, such as described in step 350 of method 300.

At step 440, a first LM interpolation is determined. Embodiments of step 440 may determine the first LM interpolation by interpolating the component LMs, with the component LMs weighted according to their corresponding interpolation coefficients (in other words, the coefficients or weights are applied to the component LMs). Thus using the initial values for the interpolation coefficients, the component LMs are interpolated and the resulting LM interpolation used in step 450 to parse sentences of the training corpus into a collection of alternative parses (or lattices).

At step 450, a set of alternative parses are determined from the training corpus using the first LM interpolation determined in step 440. As described in connection to method 300, a parse may comprise a path or sequence of tokens representing words, entities (or classes), and/or phrases in the training corpus, and in some embodiments, the set of alternative parses determined in step 450 comprises a set of lattices, which may represent all possible parses or n-best, resulting from the component LMs. The lattices may also include some parses that will not be supported by some of the component LMs. Thus each path through a lattice corresponds to a different parse of the corpus, and each path is associated with a joint probability.

In some embodiments of step 450, only a limited number of parses are determined based on the probabilities associated with the parses. For example, in one embodiment, all possible parses of a sentence may be ranked by probability so that the more probable parses (n-best) may be used in step

460. Some embodiments of step 450 are similar to (or may be implemented as) the embodiments described in connection to step 334 or step 364 of method 300 (FIG. 3).

At step 460, second values for the interpolation coefficients are determined. The second values may comprise updated or further optimized values for the interpolation coefficients. In some embodiments, step 460 comprises determining sufficient statistics on the parses determined in step 450. In particular, in one embodiment of step 460, based on the joint probabilities determined for the parses, corresponding posterior probabilities are determined for each of the parses, indicating the probability of the parse given the set of component LMs. With these posterior probabilities, updated interpolation coefficients may be determined that reflect contribution by the component LMs for each token n-gram relative to the sum of contributions of all component LMs towards the probability of that particular n-gram. Some embodiments of step 460 are similar to (or may be implemented as) the embodiments described in connection to step 340 of method 300 (FIG. 3), where the interpolation coefficients are context independent, or step 370 of method 300 (FIG. 3), where the interpolation coefficients are context specific.

In embodiments of method 400, steps 440 through 460 optimize interpolation coefficients for the target domain, thus the second values for the interpolation coefficients are further optimized for the domain represented by the training corpus. Some embodiments of method 400 further comprise determining a second or updated LM interpolation by interpolating the component LMs, with the component LMs weighted according to the second values of their corresponding interpolation coefficients. In some embodiments, the second or updated LM interpolation may be used to determine a second set of alternative parsed representations of the corpus for a subsequent iteration of an optimization process, and the probabilities and weights determined with these alternative parsed representations are used to further update (optimize) the interpolation coefficients.

Moreover, in some embodiments of method 400 the optimized interpolation coefficients and their component LMs may be provided for deployment in an application setting, such as for use in an ASR system implemented on (or across) a user device, server, or backend computing device. In some embodiments, the component LMs may be interpolated (according to the interpolation coefficients) on the fly, as needed in a real-time application scenario. Alternatively, in some embodiments the component LMs and interpolation coefficients determined in step 460 may be combined into a single, unified LM (such as by merging the component LMs according their corresponding interpolation coefficients).

It should be noted that while FIG. 4 refers to interpolation coefficients, language model interpolations, and sets of alternative parses, such as "first" values, a "second" values, a first LM interpolation, a second LM interpolation, etc., these terms should not necessarily be interpreted as being sequential in nature. For instance, the first values for the interpolation coefficients may not, in fact, be the first iterative version of the interpolation coefficients but instead may be determined from an iteration that is not the initial iteration.

Figure 5:
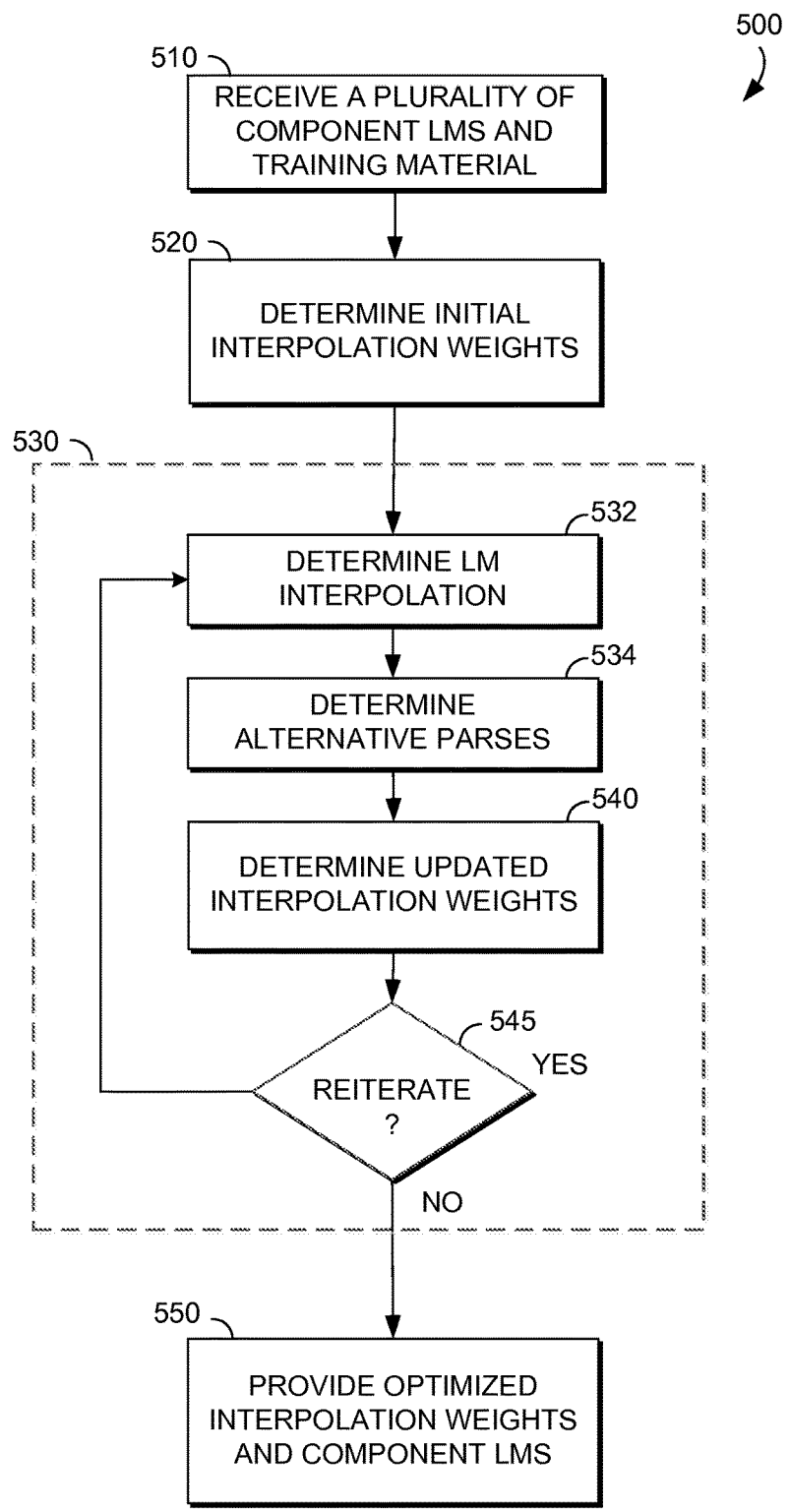
FIG. 5 depicts a flow diagram of a method for determining and optimizing a language model interpolation, in accordance with an embodiment of the present invention.

Turning to FIG. 5, a flow diagram is provided illustrating one example method 500 for determining and optimizing a language model interpolation. An interpolated language model determined according to method 500 is suitable for use in an application domain represented by a training corpus that is used to optimize the interpolation. At a high level, example method 500 provides an iterative process for determining and optimizing a set of interpolation weights, which may be used for determining an LM interpolation.

Accordingly, at step 510, a plurality of component LMs and training material are received. In one embodiment, training material comprises a training corpus of textual information. The training material may also comprise a set of entity definitions, in some embodiments. The textual information may comprise one or more alphanumeric characters, or words, which may be in sentences, or other sequences of alphanumeric character strings. In one embodiment, the training material may be received from one or more sources including user queries, SMS messages, web documents, electronic libraries, books, user input libraries, or artificially collected or created samples, for example. In one embodiment, the training material defines a domain and in one embodiment is related to a structured application domain; for example, a home entertainment system, personal device, or vehicle.

Step 510 also receives a plurality of component LMs. The component LMs may be pre-defined, in some embodiments and may be received from storage. The component LMs are referred to as "component" language models because the LMs are used as components of determining a LM interpolation. In some embodiments, at least some of the component LMs may be class-based and/or capable of determining words phrases, and entity n-grams (referred to herein as WPE language models, which unify words, phrases and entities into a single statistical framework). Some component LMs may reflect specific subdomains or certain types of corpora, such as certain classes (e.g. personal names, locations, dates/times, movies, games, etc.) words or dictionaries, phrases, or combinations of these, such as token-based component LMs. Moreover, in some embodiments, component LMs may already be optimized for their respective subdomains. In some embodiments, one or more of the component LMs may be determined in step 510. For example, a component LM may be created from statistical data determined from the training corpus, at a word-level, and entity definitions.

At step 520, initial interpolation weights are determined. As described herein, interpolation coefficients may be applied as interpolation weights for the component LMs during interpolation. Thus a component LM has a corresponding interpolation weight or coefficient, in some embodiments, which may be embodied as a vector and may be context-independent or context specific. As described in connection to FIGS. 1, 2A and 2B, these interpolation weights may be initialized and then optimized via iterative optimization processes. In some embodiments of step 520, initial interpolation weights are determined as equal (uniform distribution). The values of these initial weights may be pre-determined, or may be estimated based on the component LMs. In some embodiments of method 500 that perform context-specific interpolation, the initial interpolation weights may be determined by seeding using optimized context-independent weights, such as described in step 350 of method 300.

At portion 530 of method 500, the interpolation weights are optimized. Some embodiments of portion 530 comprise an iterative optimization process for determining optimized interpolation weights such as described herein, such as in connection to FIGS. 1 and 2A, and may be carried out in steps 532 to 545 of method 500. As described previously, a goal of the interpolation and optimization process is to determine optimized interpolation weights $\lambda_m$ so as to minimize perplexity of the resultant interpolated LM on the in-domain training corpus, such as the training material received in step 510. Accordingly, some embodiments of steps 532 through 545 may be understood as applying an EM approach to the optimization, wherein linear interpolation optimizes perplexity of a training set with respect to the collection of component LMs linearly combined in the probability space.

At step 532, an LM interpolation is determined. The LM interpolation may be determined from the component LMs and the interpolation weights, which for a first iteration may be the initial interpolation weights determined in step 520, or may have been determined in step 540 in subsequent iterations. Thus using the interpolation weights, a number of component LMs are interpolated and the resulting LM interpolation used in step 534 to parse a corpus of the training material into a collection of alternative representations or parses.

At step 534, a set of alternative parses are determined from the training material corpus using the interpolated LM determined in step 532. As previously described, a parse may comprise a path or sequence of tokens representing words, entities (or classes), and/or phrases in the training corpus, and in some embodiments, the set of alternative parses determined in step 534 comprises a lattice of parses. The lattice may represent all possible parses or n-best, resulting from the component LMs, and may also include some parses that will not be supported by some of the component LMs. Thus each path through the lattice corresponds to a different parse of the corpus, and each path is associated with a joint probability.

In some embodiments of step 534, only a limited number of parses are produced for each iteration, after the first iteration, based on the probabilities associated with the parses. For example, in one embodiment, all possible parses of a sentence may be ranked at each iteration by probability so that the more probable parses come to the top (n-best). Moreover, some embodiments of step 534 are similar to (or may be implemented as) the embodiments described in connection to step 334 or step 364 of method 300 (FIG. 3).

At step 540, updated interpolation weights are determined. The updated interpolation weights may comprise further optimized values for the interpolation coefficients. In some embodiments, step 540 comprises determining sufficient statistics on the parses determined in step 534. In particular, in one embodiment of step 540, based on the joint probabilities determined for the parses, corresponding posterior probabilities are determined for each of the parses, indicating the probability of the parse given the set of component LMs. With these posterior probabilities, updated interpolation weights may be determined that reflect contribution by the component LMs for each token n-gram relative to the sum of contributions of all component LMs towards the probability of that particular n-gram. Some embodiments of step 540 are similar to (or may be implemented as) the embodiments described in connection to step 340 of method 300 (FIG. 3), where the interpolation coefficients are context independent, or step 370 of method 300 (FIG. 3), where the interpolation coefficients are context specific.

At step 545, it is determined whether to continue iterating the optimization of portion 530 of method 500. With each iteration, the newly determined (updated) interpolation weights (determined in step 540) become further optimized for the training material. Thus in embodiments of portion 530 of method 500, the iterations of steps 532 through 540 may proceed until convergence or until optimization is determined to be sufficient or otherwise deemed satisfactory.

Some embodiments of step 545 may determine whether to reiterate in a manner similar to the embodiments described in connection to steps 345 and 375 of method 300 (FIG. 3).

In an embodiment, overtraining may be avoided by only iterating until sufficient optimization is reached. For example, for each iteration (or at times during the iterative process, such as every several iterations of after a minimum number of iterations have transpired, for example), it may be determined whether sufficient optimization has been attained. In particular, in one embodiment, an evaluation may be performed such as a validation step that checks to see if the current iteration is better than the previous one, such as by determining whether perplexity is still being decreased (or is sufficiently decreasing) with each iteration. In one embodiment, a window of iterations may be used for determining whether perplexity is no longer decreasing and therefore the iterations should cease. In one embodiment, a validation corpus may be used to check the change in perplexity and/or a threshold may be used to determine whether the decrease in perplexity, resulting from each iteration, is sufficient.

If it is determined that another iteration is to be performed, then method 500 returns to step 532, wherein an (updated) LM interpolation is determined according to the updated interpolation weights determined in step 540. On the other hand, if the optimization is determined to be satisfactory (or if convergence is determined) then method 500 proceeds to step 550, wherein the updated interpolation weights determined (in step 540) during the final iteration of portion 530 of method 500, may be provided as optimized interpolation weights.

At step 550, the optimized interpolation weights and component LMs are provided. In some embodiments of step 550, the optimized interpolation weights and component LMs may be provided for deployment in an application setting, such as for use in an ASR system implemented on (or across) a user device, server, or backend computing device. In some embodiments, the component LMs may be interpolated (according to the optimized interpolation weights) on the fly, as needed in a real-time application scenario. Alternatively, in some embodiments the optimized interpolation weights and component LMs provided in step 550 may be combined into a single, unified LM (such as merging the component LMs according their corresponding optimized interpolation weights). This unified LM, which is context-independent or context-specific, may be formed from component LMs that include class-based LMs (or LMs compatible with the WPE framework, described previously).

Accordingly, we have described various aspects of technology directed to systems and methods for improving language models by determining and optimizing language model interpolation for a domain. In particular, through embodiments of an iterative joint-modeling process, an LM interpolation is determined from a number of component LMs and used to determine a set of lattices or alternative parses of a corpus, which may be used to produce a new (or updated) interpolation coefficients for the component LMs, thereby optimizing an LM interpolation determined from the component LMs and updated coefficients.

It is understood that various features, sub-combinations, and modifications of the embodiments described herein are of utility and may be employed in other embodiments without reference to other features or sub-combinations. Moreover, the order and sequences of steps shown in the example methods 300, 400, and 500 are not meant to limit the scope of the present invention in any way and, in fact, the steps may occur in a variety of different sequences within embodiments hereof. Such variations and combinations thereof are also contemplated to be within the scope of embodiments of the invention.

Having described various embodiments of the invention, an exemplary computing environment suitable for implementing embodiments of the invention is now described. With reference to FIG. 6, an exemplary computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

Figure 6:
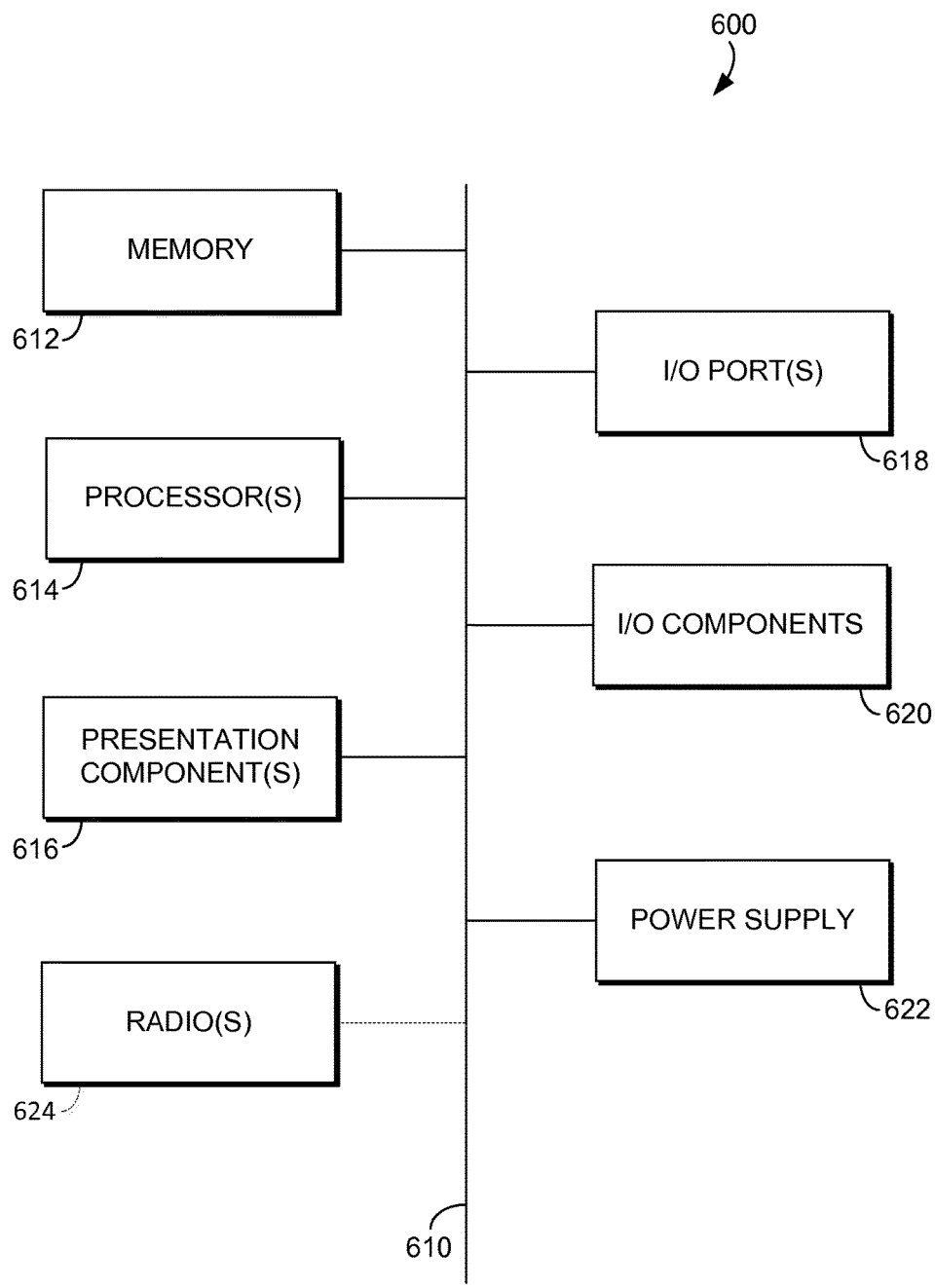
FIG. 6 is a block diagram of an exemplary computing environment suitable for use in implementing an embodiment of the present invention.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an exemplary computing device that can be used in connection with one or more embodiments of the invention. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Accordingly, in one aspect, an embodiment of the invention is directed to an automatic speech recognition (ASR) system. The system includes an acoustic sensor configured to convert speech into acoustic information; an acoustic model (AM) configured to convert the acoustic information into a first corpus of words; and a language model (LM) configured to convert the first corpus of words into plausible word sequences. The LM is determined from an interpolation of a plurality of component LMs and corresponding set of coefficient weights, wherein at least one of the component LMs is class-based, and wherein the interpolation is context-specific.

In some embodiments of the system, the LM is determined by merging the interpolated component LMs into a single unified LM according to the corresponding set of coefficient weights. Additionally, in some embodiments of the system the coefficient weights are determined and optimized according to a process including determining initial values for the weights in the set of coefficient weights; determining optimized values of the weights in the set of coefficient weights; and providing the optimized values as the coefficient weights in the set of coefficient weights. Further, in some embodiments of the system, determining the optimized values of the weights includes (a) receiving training material comprising a second corpus of one or more words; (b) determining a training LM interpolation from the component LMs and the set of coefficient weights; (c) utilizing the training LM interpolation to determine a set of alternative parses of the second corpus; (d) determining statistical data based on the set of alternative parses determined in step (c); (e) based on the statistical data determined in step (d), determining updated values of the coefficient weights in the set of coefficient weights, thereby optimizing the coefficient weights; (f) determining whether the optimization of the coefficient weights is satisfactory; and (g) based on the determination of whether the optimization of the coefficient weights is satisfactory: if the optimization is determined to be satisfactory, providing the values of the coefficient weights; and if the optimization is determined not to be satisfactory, repeating steps (b) through (g).

In another aspect, an embodiment of the invention is directed to a method for determining an optimized language model (LM) performed by one or more computing devices having a processor and a memory. The method includes receiving training material for a target domain, the training material including a corpus of one or more words and receiving a plurality of component LMs. The method also includes determining initial values of interpolation coefficients for the component LMs thereby forming a set of interpolation weights and determining a first LM interpolation based on the component LMs and the initial values of the set of interpolation weights. The method further includes: for a number of iterations, each iteration using an iteration LM interpolation: (a) utilizing the iteration LM interpolation to determine a set of alternative parses of the corpus; (b) determining posterior probabilities from each of the parses; (c) determining updated coefficient values for the set of interpolation weights thereby forming a set of updated interpolation weights; (d) determining an updated LM interpolation based on the component LMs and the set of updated interpolation weights determined in step (c); and (e) determining an evaluation of the set of updated interpolation weights, wherein the iteration LM interpolation is the first LM interpolation for the first iteration, wherein the iteration LM interpolation is the updated LM interpolation determined in step (d) for each subsequent iteration; and wherein the number of iterations is determined based on the evaluation of the set of updated interpolation weights.

In some embodiments of the method, at least one of the component LMs comprises a class-based LM, and the first LM interpolation and the iteration LM interpolation comprise a context-specific interpolation. Some embodiments of the method further comprise combining the component LMs into a single unified LM according to the set of updated interpolation weights.

In yet another aspect, an embodiment of the invention is directed to one or more computer-readable storage devices having computer-executable instructions embodied thereon, that, when executed by a computing system having a processor and memory, cause the computing system to perform a method for determining an optimized language model (LM). The method includes accessing a training corpus, the training corpus comprising one or more words, and receiving a plurality of component LMs. The method also includes determining initial values for a set of coefficient weights corresponding to the component LMs and determining a first LM interpolation based on the component LMs and corresponding coefficient weights. The method further includes based on first LM interpolation, determining a first set of alternative parses of the training corpus, and determining updated values for the set of coefficient weights based on the first set of alterative parses.

Some embodiments of the method further comprise determining a second LM interpolation using the component LMs and the updated values for the set of coefficient weights. In some embodiments of the method, at least one of the component LMs is class-based, the set of coefficient weights includes context-specific weights, and the first LM interpolation comprises a context-specific interpolation. In some embodiments of the method determining initial values for a set of coefficient weights comprises setting the values of the weights according to a uniform distribution.

What is claimed is:

1. An automatic speech recognition (ASR) system comprising:
   an acoustic sensor configured to convert speech into acoustic information;
   an acoustic model (AM) configured to convert the acoustic information into a first corpus of words; and
   a language model (LM) configured to convert the first corpus of words into plausible word sequences, the LM determined from an interpolation of a plurality of component LMs and corresponding set of coefficient weights, wherein at least one of the component LMs is class-based, and wherein the interpolation is context-specific;
   wherein the coefficient weights are determined at least in part based on a set of alternative parses of a training corpus of words;
   wherein the coefficient weights are determined according to a process comprising:
      determining a training LM interpolation from the component LMs and the set of coefficient weights,
      utilizing the training LM interpolation to determine the set of alternative parses of the training corpus,
      determining a posterior probability for each of the parses in the set of alternative parses, thereby forming a set of posterior probabilities; and
      based on the set of posterior probabilities, determining updated values of the coefficient weights.

2. The system of claim 1, wherein the ASR system is deployed on a user device.

3. The system of claim 1, wherein the LM is determined by merging the interpolated component LMs into a single unified LM according to the corresponding set of coefficient weights.

4. The system of claim 1, wherein at least one of the component LMs comprises a word-phrase-entity (WPE) model.

5. The system of claim 1, wherein the coefficient weights are determined and optimized according to a process comprising:
   determining initial values for the weights in the set of coefficient weights;
   determining optimized values of the weights in the set of coefficient weights; and
   providing the optimized values as the coefficient weights in the set of coefficient weights.

6. The system of claim 5, wherein determining the optimized values of the weights comprises:
   (a) receiving training material comprising a second corpus of one or more words;
   (b) determining a training LM interpolation from the component LMs and the set of coefficient weights;
   (c) utilizing the training LM interpolation to determine a set of alternative parses of the second corpus;
   (d) determining statistical data based on the set of alternative parses determined in step (c);
   (e) based on the statistical data determined in step (d), determining updated values of the coefficient weights in the set of coefficient weights, thereby optimizing the coefficient weights;
   (f) determining whether the optimization of the coefficient weights is satisfactory; and
   (g) based on the determination of whether the optimization of the coefficient weights is satisfactory:
      (i) if the optimization is determined to be satisfactory, providing the values of the coefficient weights; and
      (ii) if the optimization is determined not to be satisfactory, repeating steps (b) through (g).

7. The system of claim 6, wherein determining statistical data based on the set of alternative parses determined in step (c) and determining updated values of the coefficient weights in step (d) comprises:
   determining a posterior probability for each of the parses in the set of alternative parses, thereby forming a set of posterior probabilities; and
   based on the set of posterior probabilities, determining the updated values of the coefficient weights.

8. The system of claim 6, wherein the optimization of the coefficient weights is satisfactory where it has achieved convergence.

9. The system of claim 6, wherein determining whether the optimization of the coefficient weights is satisfactory comprises determining that perplexity is no longer decreasing with each iteration of steps (b) through (g).

10. A method for automatic speech recognition of a corpus of words, utilizing an optimized language model (LM), performed by one or more computing devices having a processor and a memory, the method comprising:
    receiving training material for a target domain, the training material including a first corpus of one or more words;
    receiving a plurality of component LMs;
    determining initial values of interpolation coefficients for the component LMs thereby forming a set of interpolation weights;
    determining a first LM interpolation based on the component LMs and the initial values of the set of interpolation weights;
    for a number of iterations, each iteration using an iteration LM interpolation:
    (a) utilizing the iteration LM interpolation to determine a set of alternative parses of the first corpus;
    (b) determining posterior probabilities from each of the parses;
    (c) determining updated coefficient values for the set of interpolation weights thereby forming a set of updated interpolation weights;
    (d) determining an updated LM interpolation based on the component LMs and the set of updated interpolation weights determined in step (c); and
    (e) determining an evaluation of the set of updated interpolation weights;
    wherein the iteration LM interpolation is the first LM interpolation for the first iteration, and wherein the iteration LM interpolation is the updated LM interpolation determined in step (d) for each subsequent iteration; and wherein the number of iterations is determined based on the evaluation of the set of updated interpolation weights;
    combining the component LMs into a single unified LM according to the set of updated interpolation weights;
    receiving a speech acoustic signal generated by an acoustic sensor;
    generating a second corpus of words that corresponds to the speech acoustic signal; and
    utilizing the optimized LM for automatic speech recognition of the second corpus of words.

11. The method of claim 10, wherein at least one of the component LMs comprises a class-based LM.

12. The method of claim 11, wherein the first LM interpolation and the iteration LM interpolation comprise a context-specific interpolation.

13. The method of claim 10, further comprising combining the component LMs into a single unified LM according to the set of updated interpolation weights.

14. The method of claim 10, wherein determining initial values of interpolation coefficients comprises setting the values of the weights according to a uniform distribution.

15. The method of claim 10, wherein the set of interpolation weights comprises context-specific weights, and wherein initial values of interpolation coefficients are determined seeding using a set of context-independent weights.

16. The method of claim 10, wherein evaluating the set of updated interpolation weights comprises:
(i) determining that the interpolation weights have converged on the corpus, or
(ii) for each iteration:
determining a perplexity;
comparing the determined perplexity for a current iteration with the determined perplexity from a preceding iteration; and
based on the comparison, determining that the perplexity is not improving.

17. One or more computer-readable storage devices having computer-executable instructions embodied thereon, that, when executed by a computing system having a processor and memory, cause the computing system to perform a method of automatic speech recognition of a first corpus of words utilizing an optimized language model (LM), the method comprising:
accessing a training corpus, the training corpus comprising one or more words;
receiving a plurality of component LMs;
determining initial values for a set of coefficient weights corresponding to the component LMs;
determining a first LM interpolation based on the component LMs and corresponding coefficient weights;
based on first LM interpolation, determining a first set of alternative parses of the training corpus; and
determining updated values for the set of coefficient weights based on the first set of alternative parses, wherein determining the updated values comprises
determining posterior probabilities for each parse in the set of alternative parses, and
based on the set of posterior probabilities, determining the updated values of the coefficient weights;
combining the component LMs into a single unified LM according to the corresponding coefficient weights; and
utilizing the unified LM to perform automatic speech recognition on the first corpus of words.

18. The one or more computer-readable storage devices of claim 17, further comprising determining a second LM interpolation using the component LMs and the updated values for the set of coefficient weights.

19. The one or more computer-readable storage devices of claim 17, wherein at least one of the component LMs is class-based, wherein the set of coefficient weights includes context-specific weights, and wherein the first LM interpolation comprises a context-specific interpolation.

20. The one or more computer-readable storage devices of claim 17, wherein determining initial values for a set of coefficient weights comprises setting the values of the weights according to a uniform distribution.

* * * * *